US011755783B2

(12) United States Patent
Dunjic et al.

(10) Patent No.: US 11,755,783 B2
(45) Date of Patent: *Sep. 12, 2023

(54) ENFORCING RESTRICTIONS ON CRYPTOGRAPHICALLY SECURE EXCHANGES OF DATA USING PERMISSIONED DISTRIBUTED LEDGERS

(71) Applicant: The Toronto-Dominion Bank, Toronto (CA)

(72) Inventors: Milos Dunjic, Oakville (CA); Arthur Carroll Chow, Markham (CA); David Samuel Tax, Toronto (CA); Armon Rouhani, Toronto (CA); Asad Joheb, Toronto (CA); Sara Hatherly, Alliston (CA); Keith Sanjay Ajmani, Toronto (CA); Lionel Johnson, Mississauga (CA); Yubing Liu, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,589

(22) Filed: Jun. 22, 2021

(65) Prior Publication Data

US 2021/0319137 A1 Oct. 14, 2021

Related U.S. Application Data

(63) Continuation of application No. 16/288,867, filed on Feb. 28, 2019, now Pat. No. 11,093,649, which is a
(Continued)

(51) Int. Cl.
*G06F 16/18* (2019.01)
*G06F 16/182* (2019.01)
(Continued)

(52) U.S. Cl.
CPC .......... *G06F 21/64* (2013.01); *G06F 16/1805* (2019.01); *G06F 16/1834* (2019.01);
(Continued)

(58) Field of Classification Search
CPC .. G06F 21/64; G06F 16/1805; G06F 16/1834; H04L 9/006; H04L 9/3247; H04L 9/50; H04L 9/0894; H04L 9/3239
See application file for complete search history.

(56) References Cited

U.S. PATENT DOCUMENTS 10,762,506 B1 * 9/2020 Cash .................... G06Q 20/206
2006/0287953 A1 12/2006 Chauhan
(Continued)

FOREIGN PATENT DOCUMENTS

| CN | 107862600 A | 3/2018 |
| EP | 0956673 A1 | 11/1999 |
| WO | 2017027900 A1 | 2/2017 |

OTHER PUBLICATIONS

Bootstrapping a Blockchain Based Ecosystem for Big Data Exchange, by Chen et al., published 2017 (Year: 2017).*
(Continued)

*Primary Examiner* — Vu V Tran
(74) *Attorney, Agent, or Firm* — Duane Morris LLP

(57) ABSTRACT

The disclosed exemplary embodiments include computer-implemented systems, apparatuses, and processes that manage cryptographically secure exchanges of data using a permissioned distributed ledger. For example, an apparatus obtains parameter values characterizing an exchange of data and transmits the parameter values to a first computing system, which executed instructions included within a distributed ledger. The executed additional instructions cause the first computing system to access rules data recorded onto the distributed ledger and establish a consistency between
(Continued)

the parameter values and at least a portion of the accessed rules data. The apparatus receives, from the first computing system, confirmation data indicative of the established consistency, and based on the confirmation data, transmit a request to execute the data exchange in accordance with at least the portion of the parameter values to a second computing system.

20 Claims, 10 Drawing Sheets

Related U.S. Application Data continuation of application No. 16/281,718, filed on Feb. 21, 2019, now Pat. No. 11,526,630.

(51) Int. Cl.
*H04L 9/00* (2022.01)
*H04L 9/32* (2006.01)
*H04L 9/08* (2006.01)
*G06F 21/64* (2013.01)

(52) U.S. Cl.
CPC ............ *H04L 9/006* (2013.01); *H04L 9/3247* (2013.01); *H04L 9/50* (2022.05)

(56) References Cited

U.S. PATENT DOCUMENTS

| | | | |
|---|---|---|---|
| 2007/0208574 A1* | 9/2007 | Zheng | G06Q 10/10 705/1.1 |
| 2008/0109279 A1 | 5/2008 | Csoka | |
| 2017/0004501 A1 | 1/2017 | Ledford et al. | |
| 2017/0098203 A1 | 4/2017 | Rolfson | |
| 2017/0237554 A1 | 8/2017 | Jacobs et al. | |
| 2017/0243177 A1* | 8/2017 | Johnsrud | G06Q 20/10 |
| 2017/0243215 A1 | 8/2017 | Sifford | |
| 2017/0270493 A1 | 9/2017 | Lugli et al. | |
| 2017/0300876 A1 | 10/2017 | Muscala | |
| 2018/0060927 A1 | 3/2018 | Gupta | |
| 2018/0158054 A1 | 6/2018 | Ardashev | |
| 2018/0165588 A1 | 6/2018 | Saxena | |
| 2019/0333031 A1* | 10/2019 | Kravitz | G06Q 20/06 |
| 2020/0074416 A1* | 3/2020 | Mathew | G06Q 20/24 |
| 2020/0074418 A1 | 3/2020 | Mathew | |
| 2020/0184448 A1* | 6/2020 | Jain | G06Q 20/403 |
| 2021/0166221 A1* | 6/2021 | Noh | G06Q 20/3223 |

OTHER PUBLICATIONS

Guo et al., "Blockchain application and outlook in the banking industry," Financial Innovation (2016) 2: 24 (12 pages).

Zheng, et al., "An Overview of Blockchain Technology; Architecture, Consensus, and Future Trends," 2017 IEEE 6th International Congress on Big Data, pp. 557-564.

"IntellectEU Announces Catalyst to Integrate Blockchain Networks with Existing Core Systems," Apr. 19, 2018 (3 pages).

Piscini et al., "Blockchain: Trust Economy—Taking control of digital identity," Deloitte University Press, 2017 (14 pages).

* cited by examiner

ENFORCING RESTRICTIONS ON CRYPTOGRAPHICALLY SECURE EXCHANGES OF DATA USING PERMISSIONED DISTRIBUTED LEDGERS

CROSS-REFERENCE TO RELATED APPLICATION

This application is a continuation of, and claims the benefit of priority to, U.S. application Ser. No. 16/288,867, filed Feb. 28, 2019, which is a continuation of, and claims the benefit of priority to, U.S. application Ser. No. 16/281,718, filed Feb. 21, 2018. The disclosures of each of these applications are expressly incorporated herein by reference to their entireties.

TECHNICAL FIELD

The disclosed embodiments generally relate to computer-implemented systems and processes that enforce restrictions on cryptographically secure exchanges of data using permissioned distributed ledgers.

BACKGROUND

Many transaction processing networks, such as payment rails that facilitate electronic funds transfer (EFT) transactions or automated funds transfer (AFT) credit or debit transactions, accept input structured in accordance with one or more established data-interchange formats. These established data-interchange formats may, in some instances, be incompatible with standardized messaging formats that facilitate exchanges of data between financial institutions and that supplement textual payment instructions with enriched content characterizing an underlying payment transaction.

SUMMARY

In some examples, an apparatus includes a communications interface, a memory storing instructions, and at least one processor coupled to the communications interface and the memory. The at least one processor is configured to execute the instructions to obtain transaction data that includes parameter values characterizing an exchange of data, and to generate and transmit, via the communications interface, a first signal that includes the parameter values to a first computing system. The first signal causes the first computing system to execute additional instructions included within a distributed ledger, and the executed additional instructions cause the first computing system to access rules data recorded onto the distributed ledger and establish a consistency between the parameter values and at least a portion of the accessed rules data. The at least one processor is further configured to execute the instructions to receive, via the communications interface, a second signal that includes confirmation data indicative of the established consistency, and based on the confirmation data, to generate and transmit, via the communications interface, a third signal that includes a request to execute the data exchange to a second computing system. The request includes at least a portion of the parameter values, and the third signal causes the second computing system to execute the data exchange in accordance with at least the portion of the parameter values.

In other examples, a computer-implemented method includes obtaining, by at least one processor, transaction data that includes parameter values characterizing an exchange of data, and by the at least one processor, generating and transmitting a first signal that includes the parameter values to a first computing system. The first signal causes the first computing system to execute additional instructions included within a distributed ledger, and the executed additional instructions cause the first computing system to access rules data recorded onto the distributed ledger and establish a consistency between the parameter values and at least a portion of the accessed rules data. The computer-implemented method also includes receiving, by the at least one processor, a second signal that includes confirmation data indicative of the established consistency, and based on the confirmation data, generating and transmitting, by the at least one processor, a third signal that includes a request to execute the data exchange to a second computing system. The request includes at least a portion of the parameter values, and the third signal causes the second computing system to execute the data exchange in accordance with at least the portion of the parameter values.

Further, in some examples, a tangible, non-transitory computer-readable medium stores instructions that, when executed by at least one processor, cause the at least one processor to perform a method that includes obtaining transaction data that includes parameter values characterizing an exchange of data, and generating and transmitting a first signal that includes the parameter values to a first computing system. The first signal causes the first computing system to execute additional instructions included within a distributed ledger, and the executed additional instructions cause the first computing system to access rules data recorded onto the distributed ledger and establish a consistency between the parameter values and at least a portion of the accessed rules data. The method also includes receiving a second signal from the first computing system that includes confirmation data indicative of the established consistency, and based on the confirmation data, generating and transmitting a third signal that includes a request to execute the data exchange to a second computing system. The request includes at least a portion of the parameter values, and the third signal causes the second computing system to execute the data exchange in accordance with at least the portion of the parameter values.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
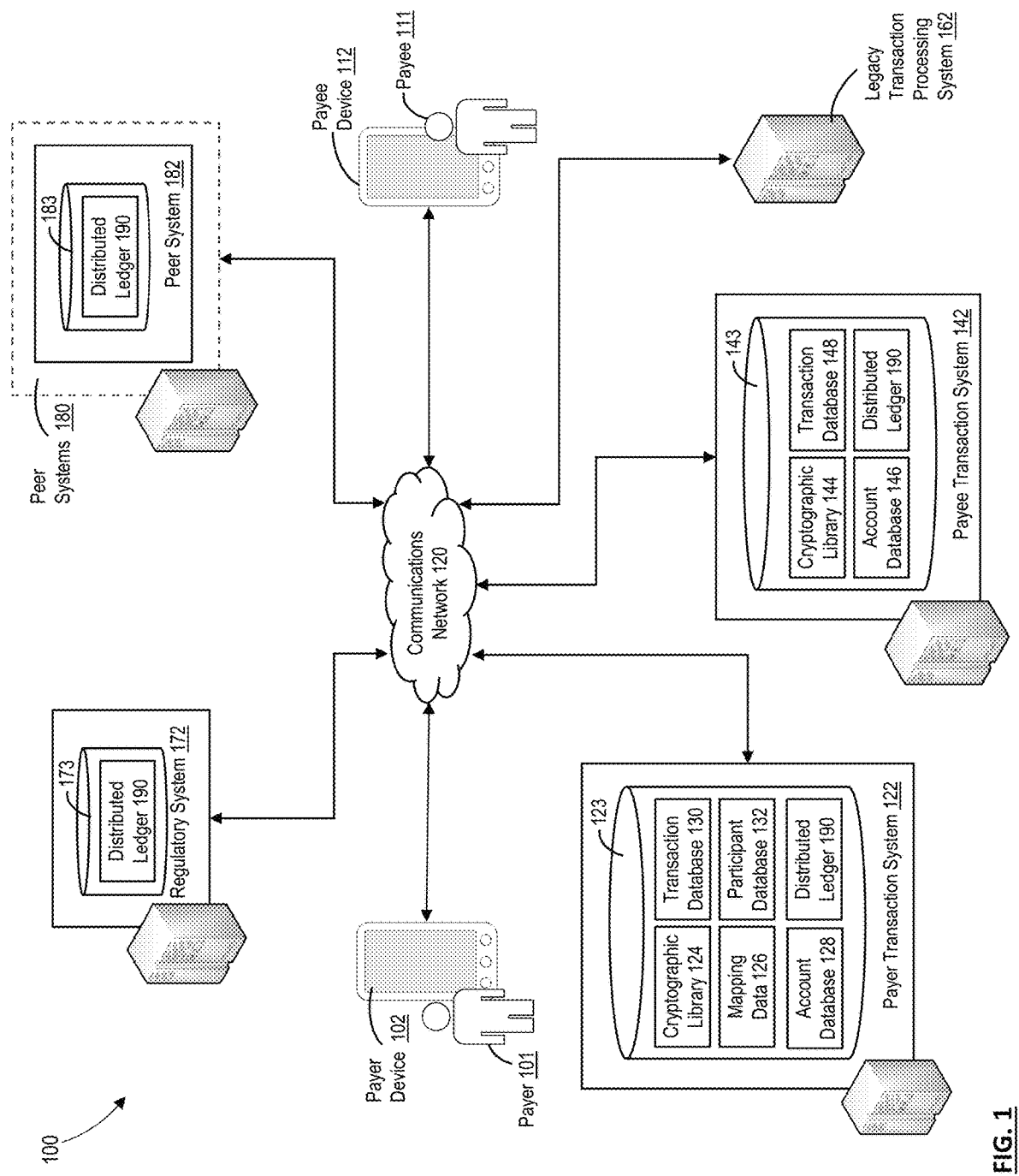
FIG. 1 is a diagram of an exemplary computing environment, consistent with disclosed embodiments.

This specification relates to computer-implemented processes that, among other things, initiate, execute, and manage cryptographically secure exchanges of data between network-connected devices and systems using a permissioned distributed ledger. As described herein, a computing environment may include one or more network-connected devices and computing systems capable of exchanging, accessing, or processing message data across one or more communications networks. These network-connected devices and computing systems may, for example, be dispersed across multiple geographic regions, and may be operated by various individuals, business entities, or governmental or regulatory entities having corresponding roles, responsibilities, or capabilities. In some instances, and to facilitate data accessibility and interoperability, the data exchanged between the network-connected systems and devices may be structured in accordance with one or more standard data-interchange formats, and information that defines and characterizes the one or more standard messaging formats may be maintained by each of the network-connected devices or computing systems.

Byway of example, the computing environment may include computing systems operated by, associated with, or maintained by corresponding financial institutions, each of which may provide certain financial services to customers. In some instances, these computing systems, e.g., "transaction systems," may perform operations that provision executable application programs to one or more network-connected devices operated by the customers, and may perform operations that provide one or more of the financial services to the customers based on data exchanged programmatically between the executed application programs and the transaction systems.

For instance, a network-connected device operated by a customer of a financial institution (e.g., a "payer" device) may execute a payment application provisioned by a network-connected computing system associated with the financial institution. Upon execution of the payment application, the payer device may perform operations that generate values of parameters that characterize one or more payment transactions involving the customer (e.g., a payer) and corresponding counterparties (e.g., payees), and that package the generated parameter values for each of the one or more payment transactions into corresponding elements of transaction data.

For example, each of the transaction data elements may be structured in accordance with, one or more standardized data-interchange formats, such as, but not limited to, an ISO 20022™ standard data-interchange format that facilitates electronic data interchange between financial institutions. Further, and in addition to parameters values structured in accordance with ISO 20022™ standard format, one or more of the transaction data elements may include enriched content, e.g., rich transaction remittance data, that further characterizes a corresponding payment transaction, such as, but not limited to, an electronic copy or a digital image of an underlying invoice or a packing list, or payment advice associate with the corresponding payment transaction. As described herein, the payer device may transmit the generated transaction data elements to a network-connected computing system operated by the payer's financial institution, e.g., a payer transaction system, across a corresponding communications network.

Based on the received elements of the transaction data, the payer transaction system may perform operations execute, clear, and settle each of the payment transactions in accordance with the corresponding ones of the generated parameter values and in conjunction with one or more computing systems operated by financial institutions that provide financial services to the payees, e.g., one or more payee transaction systems. For instance, each of the payer and payee transaction systems, and the payer and payee financial institutions that operate corresponding ones of the payer and payee transaction systems, may be associated with, or participate in, one or more transaction processing networks. Examples of the one or more transaction processing networks include, but are not limited to, a payment rail that facilitates a clearance and settlement of electronic funds transfer (EFT) transactions between counterparties and a payment rail that facilitates automated funds transfer (AFT) credit transactions between counterparties (e.g., that facilitate payroll processing) and/or AFT debit transactions between counterparties (e.g., that facilitate bill payment transactions, such as mortgage payments, etc.).

For example, the payer transaction system may parse the received payment data to identify a subset of the initiated payment transactions capable of being executed, settled, and cleared by corresponding ones of the transaction processing networks, such as the payment rails described herein. For each of the transaction processing networks, the payer transaction system may extract all or a portion of the elements of the received payment data associated with the identified subset of the payment transactions, and may perform operations that package the extracted transaction data into a format appropriate to and specified by a computing system associated with the corresponding transaction processing network, e.g., a transaction processing system.

In some instances, certain of the transaction processing systems may be associated with, or operated by, a legacy transaction processing network, such as, but not limited to, a legacy payment rail that processes transaction data structured in accordance with a legacy data-interchange format incompatible with the ISO 20022™ standard data-interchange format. By way of example, payment instruction information formatted in accordance with the legacy data format may include parameter values different from those specified by the ISO 20022™ standard data-interchange format (e.g., the parameters values specified by the legacy format may include a subset of those available to the ISO 20022™ standard data-interchange format), and additionally or alternatively, may include parameter values having an ordering that differs from that characterizing the ISO 20022™ standard data-interchange format. In other examples, the transaction processing systems associated with or operated by the legacy transaction processing network (e.g., "legacy transaction processing systems) may be incapable of processing the rich transaction remittance data characteristic of transaction data structured in accordance with the ISO 20022" standard data-interchange format.

To facilitate and maintain a compatibility with these legacy transaction processing systems, a payer transaction system may perform operations that, for a corresponding one of the payment transactions, parses elements of transaction data structured in accordance with the ISO 20022™ standard data-interchange format to extract the payment instruction information and any elements of rich transaction remittance data. The payer transaction system may perform further operations that modify the structure of the extracted payment instruction information to conform with the legacy data-interchange format, and to submit the modified payment instruction information for processing by the legacy transaction processing systems. Although these processes, which exclude the rich transaction remittance data from the submitted payment instruction information, maintain a compatibility with the legacy transaction processing systems, they also limit an opportunity of the corresponding payee transaction systems and additionally, or alternatively, corresponding payee devices, to access the rich transaction remittance data characterizing the cleared and settled payment transaction, e.g., for auditing purposes, for dispute settlement, etc.

In other instances, and to facilitate a compatibility with the rich transaction remittance data, certain conventional solutions may replace the legacy transaction processing systems (e.g., with updated hardware and executable applications capable of settling and clearing initiated payment transactions based on transaction data structured in accordance with the ISO 20022™ standard data-interchange format), or may provision additional elements of executable code, e.g., code patches, that, when executed by the legacy transaction processing systems in conjunction with legacy settlement and clearance applications, facilitate a compatibility of these legacy settlement and clearance applications with transaction data structured in accordance with the ISO 20022™ standard data-interchange format. The replacement of the legacy transaction processing systems that support the legacy transaction processing network may, in some instances, be impractical from a financial or logistical perspective, and the provision of successive patches to the executed legacy settlement and clearance applications may degrade a cryptographic security of the legacy transaction processing system and expose the legacy transaction processing system to unforeseen, or unexpected, vulnerabilities.

In some embodiments, described herein, the payer and payee computing systems may perform operations that, in conjunction with one or more additional computing systems, establish and maintain a permissioned distributed ledger network that facilitates a cryptographically secure distribution of selected elements of rich transaction remittance data among multiple participants, such as, but not limited to, the payee and payer transaction systems, the payer and payee devices, and additional computing systems operated by governmental or regulatory entities. Certain of the exemplary processes described herein, which enable the payer transaction system, the payee transaction system, and other network-connected devices and systems that participate in the permissioned distributed ledger network to access and process the rich transaction remittance data characterizing payment transactions cleared and settled the one or more legacy transaction processing systems, can be implemented in addition to, or as an alternate to, other processes that discard the rich transaction remittance data, or that maintain a compatibility based on software patches provisioned to the legacy transaction processing systems.

FIG. 1 is a diagram illustrating an exemplary computing environment 100, consistent with certain disclosed embodiments. As illustrated in FIG. 1, environment 100 may include one or more client devices, such as a payer device 102 (e.g., associated with a payer 101) and a payee device 112 (e.g., associated with payee 111), one or more transaction systems, such as payer transaction system 122 and payee transaction system 142, and one or more legacy transaction processing systems, such as legacy transaction processing system 162. Environment 100 may also include one or more computing systems associated with, or operated by, a corresponding regulatory or governmental entity, such as regulatory system 172, and further, one or more peer systems 180, such as peer system 182.

As illustrated in FIG. 1, each of payer device 102, payee device 112, payee transaction system 142, legacy transaction processing system 162, regulatory system 172, and peer systems 180, including peer system 182, may be interconnected through any combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Payer device 102 may, in some instances, correspond a computing device that includes one or more tangible, non-transitory memories storing data and software instructions, and one or more processors coupled to the one or more tangible, non-transitory memories and configured to execute the stored software instructions. The stored software instructions may, include one or more application programs, one or more application modules, or other elements of code (e.g., widgets, etc.) executable by the one or more processors. By way of example, and as described herein, payer device 102 may store, within the one or more tangible, non-transitory memories, a payment application that, when executed by the one or more processors, causes payer device 102 to perform operations that generate discrete elements of transaction data characterizing one or more exchanges of data involving one or more corresponding counterparties (e.g., a payment transaction), and that transmit the transaction data elements across network 120 to one or more transaction systems, such as payer transaction system 122. In some instances, payer device 102 may be associated with or operated by a corresponding user, such as payer 101, and examples of payer device 102 include, but are not limited to, as a smart phone, tablet computer, a desktop computer, a gaming console, a wearable device, or another computing device, system, or apparatus associated with a payer 101

Payer device 102 may also include a communications unit coupled to the one or more processors for accommodating wireless communication with any of the additional network-connected systems or devices described, e.g., one or more wireless transceivers that facilitate wireless communications across network 120. Further, payer device 102 may include a display unit coupled to the one or more processors and configured to present interface elements to payer 101, and one or more input units coupled to the one or more processors and configured to receive input from payer 101. By way of example, the display unit may include, but is not limited to, an LCD display, a TFT display, and OLED display, or other appropriate type of display unit, and one or more input units may include, but are not limited to, a keypad, keyboard, touchscreen, fingerprint scanner, microphone, voice activated control technology, stylus, or any other appropriate type of input unit. Further, in some examples, the functionalities of the display and input units may be combined into a single device, such as a pressure-sensitive touchscreen display unit that can present interface elements and can detect an input from payer 101 via physical touch.

Payee device 112 may also correspond a computing device that includes one or more tangible, non-transitory memories storing data and software instructions, and one or more processors coupled to the one or more tangible, non-transitory memories and configured to execute the stored software instructions. Further, payee device 112 may include components, such as, but not limited to, a communications unit, an input unit, and a display unit, similar in structure and functionality to those described herein in reference to payer device 102. Additionally, the description of payer device 102, as set forth below, may also apply to payee device 112 and to other client devices within environment 100, which may include components similar in structure and functionality to those described herein.

In some instances, payee transaction system 142, legacy transaction processing system 162, regulatory system 172, and each of peer systems 180 (including peer system 182) may represent a computing system that includes one or more servers and tangible, non-transitory memory devices storing executable code and application modules. The servers may each include one or more processor-based computing devices, including one or more processors, which may be configured to execute portions of the stored code or application modules to perform operations consistent with the disclosed embodiments, including operations consistent with the exemplary process described herein that initiate, execute, and manage permissioned and cryptographically secure exchanges of data using distributed ledgers. Further, payee transaction system 142, legacy transaction processing system 162, regulatory system 172, and each of peer systems 180 (including peer system 182) may each include a communications unit or interface coupled to the one or more processors for accommodating wireless communication with any of the additional network-connected systems or devices described, e.g., one or more wireless transceivers that facilitate wireless communications across network 120.

In other instances, one or more of payee transaction system 142, legacy transaction processing system 162, regulatory system 172, and peer systems 180 (including peer system 182) may correspond to a distributed system that includes computing components distributed across one or more networks, such as network 120, or other networks, such as those provided or maintained by cloud-service providers. In further aspects, one or more of payee transaction system 142, legacy transaction processing system 162, regulatory system 172, and peer systems 180 (including peer system 182) can be incorporated into a single computing system, as described herein.

Payer transaction system 122 and payee transaction system 142 may perform operations that, among other things, initiate, execute, or process exchanges of data based on elements of transaction data generated by payer device 102, e.g., based on direct communication across network 120 or based on an interaction within one or more additional computing systems operating within environment 100, such as, but not limited to, legacy transaction processing system 162. For example, payer transaction system 122 may be associated with, or operated by, a financial institution that provides financial services to payer 101 (e.g., a "payer" financial institution), and payee transaction system 142 may be associated with, or operated by, another financial institution that provides financial services to payee 111 (e.g., a "payee" financial institution). Further, in some instances, the exchanges of data may facilitate one or more payment transactions that electronically transfer funds from a source account held by payer 101 at the payer financial institution to one or more destination accounts held by payee 111 (or other users or business entities) at the payer financial institution, e.g., in satisfaction of an existing or ongoing obligation.

To facilitate a performance of these exemplary processes, payer transaction system 122 may maintain, within the one or more tangible, non-transitory memories, a data repository 123 that includes, but is not limited to, a cryptographic library 124, mapping data 126, an account database 128, a transaction database 130, and a participant database 132. In some instances, cryptographic library 124 may include an asymmetric cryptographic key pair associated with, generated by, or assigned to payer transaction system 122 (e.g., a private cryptographic key and a corresponding public cryptographic key), along with public key certificates associated with one or more additional computing systems within environment 100, such as, but not limited to, payee device 112, payee transaction system 142, and regulatory system 172.

Mapping data 126 may include data that maps or transforms one or more elements of data structured in accordance with a standardized data-interchange format, such as the ISO 20022™ standard data-interchange format described herein, into corresponding elements of data structured in accordance with one or more legacy data-interchange formats, e.g., a legacy data-interchange format associated with and suitable for processing by legacy transaction processing system 162. Account database 128 may include structured or unstructured data records that identify and characterize one or more financial services accounts issued by the payer financial institution to payer 101 and other customers and in some instances, transaction database 130 may include structured or unstructured data records that identify and characterize one or more exchanges of data (e.g., payment transactions) submitted for settlement and clearance using any of the exemplary processes described herein, or additional exchanges of data settled and cleared using any of the exemplary processes described herein.

As illustrated in FIG. 1, payee transaction system 142 may maintain, within the one or more tangible, non-transitory memories, a data repository 143 that includes, but is not limited to, a cryptographic library 144, an account database 146, and a transaction database 148. Cryptographic library 144 may include an asymmetric cryptographic key pair associated with, generated by, or assigned to payee transaction system 142 (e.g., a private cryptographic key and a corresponding public cryptographic key), which may enable payee transaction system 142 to access and process selectively encrypted, payee-specific elements of transaction data immutably recorded onto a distributed ledger, as described herein. Further, in some instances, account database 146 and transaction database 148 may include structured or unstructured records that store data similar to that described herein in reference to account database 128 and transaction database 130, e.g., as maintained in data repository 123 of payer transaction system 122.

Legacy transaction processing system 162 may be associated with one or more legacy transaction processing networks, examples of which include, but are not limited to, a legacy payment rail that facilitates a clearance and settlement of electronic funds transfer (EFT) transactions between counterparties and a legacy payment rail that facilitates automated funds transfer (AFT) credit transactions between counterparties (e.g., that facilitate payroll processing) and/or AFT debit transactions between counterparties (e.g., that facilitate bill payment transactions, such as mortgage payments, etc.). In some instances, legacy transaction processing system 162 may be configured to receive, from payer transaction system 122, elements of transaction data structured in accordance with a legacy data-interchange format (e.g., specified within mapping data 126), and to perform any exemplary processes described herein to execute, clear, and settle payment transactions based on corresponding elements of the legacy transaction data.

Regulatory system 172 may be associated with, or operated by, one or more governmental or regulatory entities charged with monitoring or regulating the payer or payee financial intuition or the settlement and clearance of one or more payment transactions involving these financial institutions. For example, to perform any of the exemplary processes described herein, regulatory system 172 may maintain within the one or more tangible, non-transitory memories data that includes, but is not limited to, a cryptographic library 174. Cryptographic library 174 may include an asymmetric cryptographic key pair associated with, generated by, or assigned to regulatory system 172 (e.g., a private cryptographic key and a corresponding public cryptographic key), which may enable regulatory system 172 to access and monitor selectively encrypted elements of transaction data immutably recorded onto the permissioned distributed ledger described herein.

In some instances, described herein, one or more of peer systems 180, including peer system 182, may perform consensus-based operations that establish and maintain a permissioned distributed ledger, which immutably records and tracks selectively encrypted elements of transaction data characterizing one or more payment transactions imitated, settled, and cleared based on processes implemented by legacy transaction processing system 162. For example, and using any of the exemplary processes described herein, payer transaction system 122 may broadcast, to each of peer systems 180 (including peer system 182), selectively encrypted portions of payment instruction information and/or rich transaction remittance data characterizing one of more initiated payment transactions, e.g., as extracted from elements of transaction data structured in accordance with the ISO 20022™ standard data-interchange format described herein.

Based on an implementation of the exemplary consensus-based processed described herein, peer systems 180 (including peer system 182) may generate one or more additional ledger blocks of the permissioned distributed ledger that record the selectively encrypted portions of the payment instruction information and/or the rich transaction remittance data, and may append these newly generated ledger blocks to the permissioned distributed ledger to generate an updated version of the permissioned distributed ledger. Further, although not illustrated in FIG. 1, the newly generated ledger blocks may also include additional data that facilitates an immutability and a cryptographic security of the permissioned distributed ledger, such as, but not limited to, one or more hash values of the information packaged into the newly generated ledger blocks.

By way of example, each of the selectively encrypted portions of the transaction data, as recorded within the additional ledger blocks, may be accessible to one or more of the network-connected devices or systems that participate in or monitor the exemplary transaction initiation, settlement, and clearance processes described herein, such as, but not limited to, payee device 112, payee transaction system 142, and regulatory system 172. In some instances, payee device 112, payee transaction system 142, and regulatory system 172, in conjunction with each of peer systems 180, may collectively establish a permissioned, distributed-ledger network, and peer systems 180 may perform any of the consensus-based protocols to distribute the updated version of the distributed ledger among not only each of peer systems 180, but also among the other constituent systems operating within the distributed-ledger network. For example, payee device 112, payee transaction system 142, and regulatory system 172 may each receive the updated version of the permissioned distributed ledger, e.g., as broadcast by peer systems 180, and may store the updated version of the permissioned distributed ledger within corresponding ones of the tangible, non-transitory memories, e.g., as distributed ledger 190.

To facilitate a performance of any of the exemplary processes described herein, peer system 182 may establish and maintain, within the one or more tangible, non-tangible memories, one or more structured or unstructured data repositories or databases, such as data repository 183. By way of example, data repository 183 may include, but is not limited to, a cryptographic library 184 that includes an asymmetric cryptographic key pair (e.g., a private cryptographic key and a corresponding public cryptographic key) generated by, associated with, or assigned to peer system 182. Peer system 182 may also store a current version of the distributed ledger, e.g., distributed ledger 190, within a corresponding portion of data repository 183. Further, although not illustrated in FIG. 1, each additional peer system of peer systems 180 may include components similar to those described herein in reference to peer system 182, and may store similar elements of data in data repositories establishing within corresponding ones of the tangible, non-transitory memories.

Figure 2A:
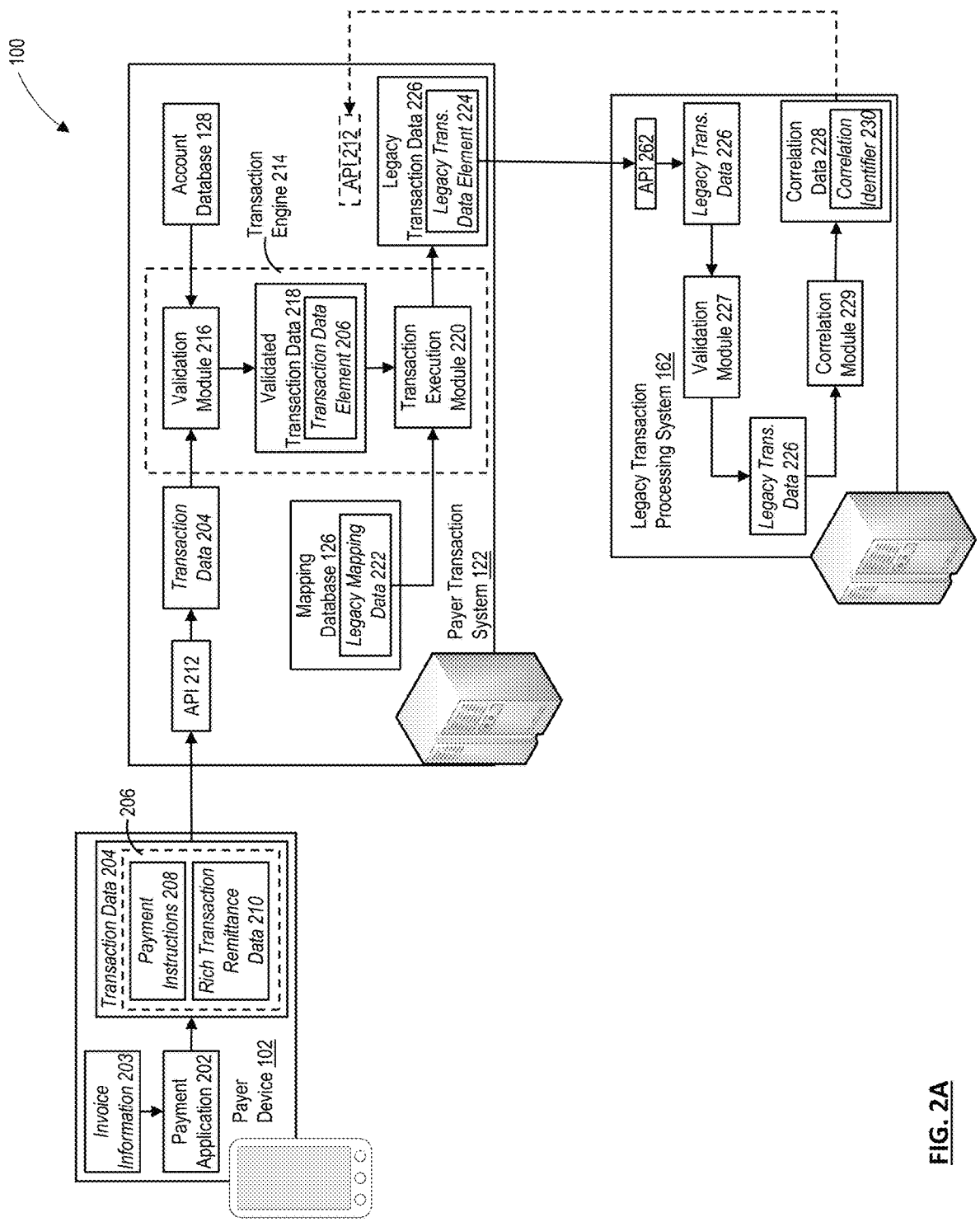
FIGS. 2A-2C, 3A-3B, and 4A-4B illustrate portions of an exemplary computing environment, in accordance with the disclosed embodiments.

Referring to FIG. 2A, the one or more processors of payer device 102 may execute an application program, e.g., payment application 202, that causes payer device to generate discrete elements of transaction data 204 identifying and characterizing one or more payment transactions between payer 101 and one or more corresponding counterparties, such as, but not limited to payee 111. The one or more payment transactions may, for example, include a bill payment transaction that satisfies an outstanding invoice for products shipped to a business (e.g., payer 101 that operates payee device 112) by a supplier (e.g., payee 111 that operates payee device 112), and payee device 112 may maintain, within the one or more transitory memories, invoice information 203 that includes, among other things, structured data characterizing the monthly invoice and additional enriched content associated with the monthly invoice. In some instances (not illustrated in FIG. 2A), payer device 102 may perform operations that generate invoice information 203 based on data received from payee device 112 across network 120 or based on input data provided to payer device 102.

For example, the outstanding invoice may be associated with an outstanding balance of $15,000 for products identified within a corresponding packing list and shipped to payer 101 on Feb. 20, 2019, and may be characterized by a due date of Mar. 20, 2019. In some instances, the structured data that characterizes the monthly invoice may include, but is not limited to, an account number of payer 101 (e.g., as assigned by the supplier), the outstanding balance of $15,000.00, the due date of Mar. 20, 2019, and payment instructions (e.g., an account or routing number associated with a financial services account held by payee 111 at the payer financial institution). Further, examples of the additional enriched content associated with the monthly invoice include, but are not limited to, an electronic copy of one or more pages of the invoice or the packing list or an electronic copy of a corresponding purchase order.

In some instances, executed payment application 202 may perform any of the processes described herein to generate a discrete element 206 of transaction data 204 that corresponds to, and characterizes, the requested bill-payment transaction involving the outstanding invoice. For example, executed payment application 202 may determine a value of one or more parameters that characterize the requested bill payment transaction based on portions of invoice information 203. Examples of these determined parameter values can include, but are not limited to, a transaction type (e.g., an EFT transaction, an ATF credit or debit transaction, etc.), a transaction amount (e.g., the outstanding balance, a different amount reflecting a credit, etc.), a transaction date or time (e.g., a predetermined or specified time prior to the due date of March 20th, such as seven days), a payer identifier (e.g., the account number of payer 101), an identifier of a source account (e.g., a routing and/or account number of a deposit account held by payer 101 at the payer financial institution) and additionally, or alternatively, an identifier of a destination account (e.g., the routing and/or account number of supplier at the payee financial institution, as specified within the invoice).

In some instances, executed payment application 202 may package the determined parameter values into corresponding portions of payment instruction information 208, which may be incorporated into transaction data element 206. Further, executed payment application 202 may also perform operations that further parse invoice information 203 to extract all or a portion of the additional enriched content (e.g., the electronic copies of the invoice or the purchase order, etc.), and that package the extracted portions of the additional enriched content into corresponding portions of rich transaction remittance data 210, which may also be included within transaction data element 206. In other instances, rich transaction remittance data 210 may also include additional information that characterizes the payment transaction associated with the supplier's invoice, such as, but not limited to, payment advice data identifying a credit to the supplier's account or payment advice characterizing a discrepancy between the transaction amount and the outstanding balance.

By way of example, transaction data element 206, and each of payment instruction information 208 and rich transaction remittance data 210 may be structured in accordance with an appropriate data-exchange format, such as the ISO 20022™ standard data-interchange format described herein. Further, executed payment application 202 may package, into corresponding portions of transaction data 204 (e.g., into a header portion, etc.), additional information that, among other things, identifies payer 101 (e.g., a login credential or digital identifier), payer device 102 (e.g., an Internet Protocol (IP) address) and/or executed payment application 102 (e.g., an application cryptogram, such as a hash value, random number, cryptographic key, etc.). Additionally, executed payment application 202 may perform any of the exemplary processes described herein to generate further elements of transaction data 204 that are associated with, and characterize, one or more corresponding additional payment transaction between payer 101 and associated counterparties.

As illustrated in FIG. 2A, executed payment application 202 may perform operations that cause payer device 102 to transmit, via the corresponding communications unit, transaction data 204 across network 120 to one or more transaction systems associated with payer 101, such as, but not limited to, payer transaction system 122. Payer transaction system 122 may receive transaction data 204 (e.g., via a corresponding communications unit or interface) and as illustrated in FIG. 2A, a secure, programmatic interface of payer transaction system 122, e.g., application programmatic interface (API) 212, may route transaction data 204 to a transaction engine 214 executed by payer transaction system 122.

In some instances, executed transaction engine 214 may perform any of the exemplary processes described herein to validate all or a portion of the elements of transaction data 204, including transaction data element 206. Responsive to a successful validation, executed transaction engine 214 may perform operations that structure the payment instruction information characterizing each validated element of transaction data 204 into a legacy data-interchange format (e.g., to generate elements of "legacy" transaction data), and that submit the legacy transaction data to legacy transaction processing system 162 for execution, settlement, and clearance.

Further, and responsive to the successful validation, executed transaction engine 214 may also perform operations that parse each validated element of transaction data 204 identify portions of the payment instruction information and additionally, or alternatively, the rich transaction remittance data, that are accessible to one or more of the participants in the exemplary permissioned, distributed-ledger network described herein. By way of example, and as described herein, executed transaction engine 214 may perform operations that identify participant-specific portions of payment instruction information 208 and/or rich transaction remittance data 210 that are accessible to payee device 112 and payee transaction system 142 and in some instances, that are accessible for monitoring by regulatory system 172.

Further, executed transaction engine 214 may selectively encrypt each of the participant-specific portions of the payment instruction information and/or the rich transaction remittance data with a public cryptographic key associated with corresponding ones of the participants. As described herein, payer transaction system 122 may broadcast the selectively encrypted portions of the payment instruction information and/or the rich transaction remittance data to each of peer systems 180, which may perform consensus-based processing to record the selectively encrypted, participant-specific portions of the payment instruction information and/or the rich transaction remittance data within one or more ledger blocks of a permission distributed ledger.

Referring back to FIG. 2A, a validation module 216 of executed transaction engine 214 may receive transaction data 204, and may perform operations that validate each of the discrete elements included within transaction data 204, including transaction data element 206. For example, validation module 216 may access transaction data element 206, and extract the information that identifies payer 101 (e.g., the login credential assigned to payer 101) and/or payer device 102 (e.g., the IP address), and/or executed payment application 102 (e.g., the application cryptogram). In one instance, validation module 216 may perform operations that validate the extracted application cryptogram, e.g., based on a comparison with a locally computed copy of the application cryptogram or a determination that the application cryptogram conforms to a predetermined format.

If validation module 216 were unable to validate transaction data element 206 (e.g., based on any of the exemplary validation processes described herein), executed transaction engine 214 may perform operations that discard transaction data element 206. In some instances, executed transaction engine 214 may perform operations that cause payer transaction system 122 to generate and transmit an error message to payer device 102 that confirms the determined invalidity of transaction data element 206 (not illustrated in FIG. 2A).

Alternatively, if validation module 216 were able to validate transaction data element 206, validation module 216 may package now-validated transaction data element 206 into a corresponding portion of validated transaction data 218. In some instances, validation module 216 may apply any of these exemplary validation processes described herein to each of the additional elements of transaction data 204 (e.g., which correspond to additional payment transactions involving payer 101 and various counterparties), and may package the validated ones of these additional elements of transaction data 204 within corresponding portions of validated transaction data 218. As illustrated in FIG. 2A, validation module 216 may provide validated transaction data 218, which includes now-validated transaction data element 206, and an input to a transaction execution module 220 of executed transaction engine 214.

In some instances, transaction execution module 220 may receive validated transaction data 218, and may perform operations to process each data element of validated transaction data 218, including now-validated transaction data element 206, and generate corresponding element of legacy transaction data 226 suitable for submission to and processing by legacy transaction processing system 162. For example, transaction execution module 220 may access validated transaction data 218, and extract transaction data element 206, which may be structured in accordance with the ISO 20022™ standard data-interchange format. Further, as illustrated in FIG. 2A, transaction execution module 220 may also access mapping data 126 (e.g., as maintained within data repository 123), and extract legacy mapping data 222 that maps or transforms one or more elements of data structured in accordance the ISO 20022™ standard data-interchange format to corresponding elements of data structured a legacy data-interchange format associated with and suitable for processing by legacy transaction processing system 162.

For example, transaction execution module 220 may access transaction data element 206 and extract payment instruction information 208 and rich transaction remittance data 210, each of which characterize the requested bill-payment transaction that satisfies the outstanding invoice from payee 111. In some instances, legacy mapping data 222 may indicate an inability of legacy transaction processing system 162 to process rich transaction remittance data 210, and based on an application of legacy mapping data 221 to portions of payment instruction information 208, transaction execution module 220 may generate corresponding portions of legacy transaction data element 224 structured in accordance with the legacy data-interchange format. As illustrated in FIG. 2A, transaction execution module 220 may perform operations that package legacy transaction data element 224 into a corresponding portion of legacy transaction data 226.

Further, and based on an application of any of the exemplary mapping or transformation processes described herein to each of the additional elements of validated transaction data 218 (e.g., which correspond to additional payment transactions involving payer 101 and various counterparties), transaction execution module 220 may generate corresponding elements of legacy transaction data structured in accordance with the legacy data-interchange format. In some instances, transaction execution module 220 may package each of these additional elements of legacy transaction data into corresponding portions of legacy transaction data 226. Further, transaction execution module 220 may package, into a corresponding portion of legacy transaction data 226 (e.g., into a header portion, etc.), additional information that, among other things, identifies payer transaction system 122 (e.g., an Internet Protocol (IP) address) and/or executed transaction engine 214 (e.g., an application cryptogram, such as a hash value, random number, cryptographic key, etc.).

Transaction execution module 220 may perform additional operations that cause payer transaction system 122 to transmit legacy transaction data 226, including legacy transaction data element 224 that characterizes the requested bill-payment transaction that satisfies the outstanding invoice from payee 111, across network 120 to legacy transaction processing system 162. A programmatic interface maintained by legacy transaction processing system 162, such as application programming interface (API) 162A associated with the legacy transaction processing network, may receive and route legacy transaction data 226 to a validation module 227. In some instances, when executed by the one or more processors of legacy transaction processing system 162, validation module 227 may perform operations that validate legacy transaction data 226 based on, among other things, the information identifying payer transaction system 122 (e.g., the IP address, etc.) and/or executed transaction engine 214 (e.g., the application cryptogram, etc.).

Based on a successful outcome of the validation process, executed validation module 227 may provide validated legacy transaction data 226, including legacy transaction data element 224, as an input to a correlation module 229. When executed by the one or more processors of legacy transaction processing system 162, correlation module 229 may perform operations that generate a unique alphanumeric identifier for each element of now-validated legacy transaction data 226, e.g., a correlation identifier, and that packages each of the correlation identifiers into a corresponding portion of correlation data 228. By way of example, and as illustrated in FIG. 2A, correlation module 229 may generate and assign unique correlation identifier 230 to legacy transaction data element 224, which corresponds to and characterizes the requested bill-payment transaction that satisfies the outstanding invoice from payee 111. In some instances, each of the generated correlation identifiers may be characterized by a predetermined length or a predetermined structure (e.g., a number of leading or trailing zeroes), and examples of the correlation identifiers include, but are not limited to, a random number or a hash value generated based on portions of corresponding elements of legacy transaction data 226.

In some instances, executed correlation module 229 may perform operations that associate each of the correlation identifiers within a corresponding element of legacy transaction data 226, and store the associated correlation identifiers and elements of legacy transaction data 226 within one or more tangible, non-transitory memories (not illustrated in FIG. 2A). Further, correlation module 229 may perform operations that cause legacy transaction processing system 162 may transmit correlation data 228, including correlation identifier 230, across network 120 to payer transaction system 122, e.g., via API 212. Further, and as described herein, legacy transaction processing system 162 may perform operations that, in conjunction with one or more additional computing systems, execute, clear, and settle each of requested payment transactions in accordance with now-validated legacy transaction data 226.

The disclosed embodiments are, however, not limited to processes by which legacy transaction processing system 162 generates and transmits each of the correlation identifiers to payer transaction system 122, e.g., in response to a receipt of corresponding elements of legacy transaction data 226. In other examples, not illustrated in FIG. 2A), transaction execution module 220 may perform additional operations that generate each of the correlation identifiers (e.g., correlation identifier 230) associate the correlation identifiers with corresponding elements of legacy transaction data 226 (e.g., to associate correlation identifier 230 with legacy transaction data element 224), and may provide the correlation identifiers to legacy transaction processing system 162 within corresponding portions of legacy transaction data 226.

Figure 2B:
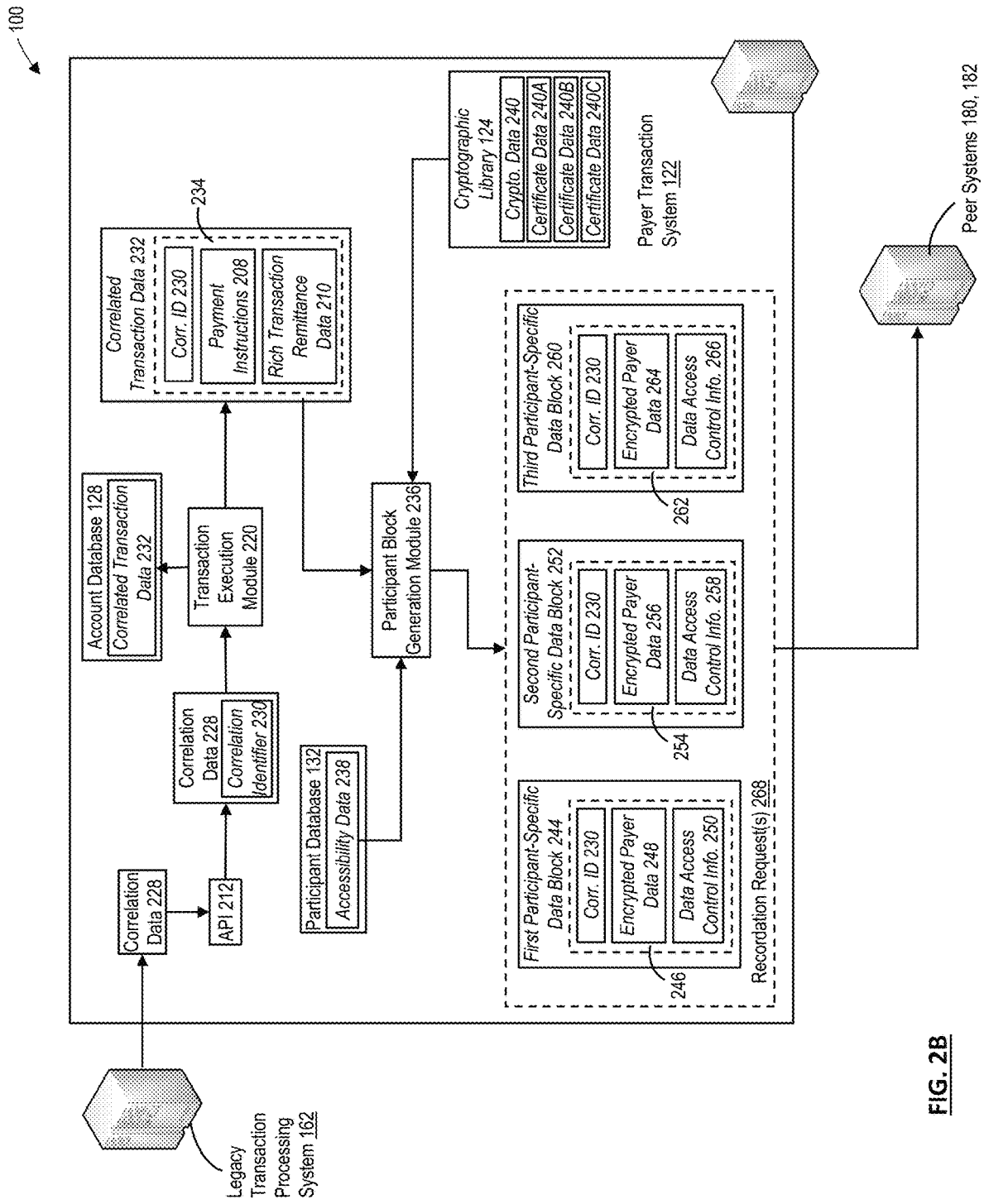

Referring to FIG. 2B, payer transaction system 122 may receive correlation data 228 (e.g., via the corresponding communications unit), and API 212 may route correlation data 228, including correlation identifier 230, to transaction execution module 220. In some instances, transaction execution module 220 may associate each correlation identifier within correlation data 228 with a corresponding element of validated transaction data 218, and may store the associated correlation identifiers and elements of validated transaction data 218 within a portion of account database 128, e.g., as correlated transaction data 232. By way of example, element 234 of correlated transaction data 232 may associate correlation identifier 230 with transaction data element 206, which characterizes the requested bill-payment transaction that satisfies the outstanding invoice associated with payee 111, and which includes payment instruction information 208 and rich transaction remittance data 210.

In some instances, transaction execution module 220 may provide correlated transaction data 232 as an input to a participant block generation module 236 of executed transaction engine 214. As illustrated in FIG. 2B, participant block generation module 236 may access the data records of participant database 132, and may extract participant accessibility data 238 that identifies and characterizes certain portions of correlated transaction data 232 accessible to one or more participants in the permissioned distributed-ledger network. As described herein, the one or more participants may include, but are not limited to, payee device 112, payee transaction system 142, or regulatory system 172.

For example, participant accessibility data 238 may indicate that each of payee device 112 (and as such payee 111) and payee transaction system 142 (and as such, the payee financial institution) are permitted to access, process, or perform operations on the rich transaction remittance data included within each element of correlated transaction data, such as rich transaction remittance data 210 of correlated transaction data element 234. Further, and by way of example, participant accessibility data 238 may also indicate that regulatory system 172 (and the corresponding regulatory or governmental entity) is permitted to access, process, or perform operations on a participant-specific portion of the rich transaction remittance data and the payment instruction information included within each element of correlated transaction data. In other instances, participant accessibility data 238 may identify participant-specific portions of the rich transaction remittance data and/or the payment instruction information accessible to additional, or alternate, participants in the permissioned distributed-ledger network, such as, but not limited to, one or more computing systems operated by, or associated with, other regulatory or governmental entities.

In some instances, and based on portions of participant accessibility data 238, participant block generation module 236 may process each element of correlated transaction data 232 and extract a corresponding portion of the rich transaction remittance data and/or the payment instruction information that is accessible to payee device 112, payee transaction system 142, and regulatory system 172. For example, participant block generation module 236 may access and process correlated transaction data element 234 (e.g., which characterizes the requested bill-payment transaction that satisfies the outstanding invoice from payee 111), and based on the portions of participant accessibility data 238, establish that rich transaction remittance data 210 is accessible to both payee device 112 (and as such, to payee 111) and payee transaction system 142 (and as such, to the payee financial institution). In further examples, participant block generation module 236 may establish that a selected portion of payment instruction information 208 (e.g., the transaction amount, transaction date or time, etc.) and a selected portion of rich transaction remittance data 210 (e.g., a portion of the payment advice, etc.) is accessible to regulatory system 172 and as such, to the associated regulatory entity.

As illustrated in FIG. 2B, participant block generation module 236 may access cryptographic library 124, and may perform operations that extract payer cryptographic data 240, which include a private cryptographic key associated with payer transaction system 122 and a public key certificate (and corresponding public cryptographic key). Further, participant block generation module 236 may also extract, from cryptographic library 124: (i) certificate data 242A, which includes a public key certificate of payee device 112; (ii) certificate data 242B, which includes a public key certificate of payee transaction system 142; and (iii) certificate data 242C, which includes a public key certificate of regulatory system 172. In some instances, each of the public key certificates may be generated by a corresponding certificate authority operating within environment 100, e.g., a certificate authority associated with the permissioned distributed-ledger network described herein.

Participant block generation module 236 may perform operations that encrypt rich transaction remittance data 210 (which is accessible to both payee device 112 and to payee transaction system 142) using the private cryptographic key of payer transaction system 122, and encrypt the selected portions of payment instruction information 208 and rich transaction remittance data 210 (which are accessible to regulatory system 172) using the private cryptographic key of payer transaction system 122. In some instances, participant block generation module 236 may package encrypted rich transaction remittance data 210 into a corresponding portion of an element 246 of first participant-specific data block 244 associated with payee device 112, e.g., as encrypted transaction data 248. Further, and as illustrated in FIG. 2B, participant block generation module 236 may also associate correlation identifier 230 with encrypted transaction data 248 and package correlation identifier 230 into element 246.

Participant block generation module 236 may also generate, and package into an additional portion of first participant-specific data element 246, data access control information 250 that enables one or more additional computing systems within environment 100, such as payee device 112, to establish an integrity and authenticity of both element 246 and encrypted transaction data 248. By way of example, participant block generation module 236 may apply a digital signature to correlation identifier 230 and to encrypted transaction data 248, e.g., using on any appropriate digital-signature algorithm based on the private cryptographic key of payer transaction system 122. In some instances, participant block generation module 236 may package the digitally signed correlation identifier 230 and encrypted transaction data 248 into data access control information 250, along with the public key certificate of payee device 112 (e.g., extracted from certificate data 242A) and the public key certificate of payer transaction system 122 (e.g., as extracted from payer cryptographic data 240).

In further instances, illustrated in FIG. 2B, participant block generation module 236 may also package encrypted rich transaction remittance data 210 (e.g., which is accessible to payer transaction system 122 in decrypted form) into a corresponding portion of an element 254 of second participant-specific data block 252 associated with payee transaction system 142, e.g., as encrypted transaction data 256. Additionally, in some instances, participant block generation module 236 may associate correlation identifier 230 with encrypted transaction data 256 and package correlation identifier 230 into element 254.

Participant block generation module 236 may also generate, and package into an additional portion of second participant-specific data element 254, data access control information 258 that enables payee transaction system 142 to establish an integrity and authenticity of both element 254 and encrypted transaction data 256. By way of example, participant block generation module 236 may apply an additional digital signature to correlation identifier 230 and to encrypted transaction data 256, e.g., using any appropriate digital-signature algorithm based on the private cryptographic key of payer transaction system 122. In some instances, participant block generation module 236 may package the digitally signed correlation identifier 230 and encrypted transaction data 256 into data access control information 258, along with the public key certificate of payee transaction system 142 (e.g., extracted from certificate data 242B) and the public key certificate of payer transaction system 122 (e.g., as extracted from payer cryptographic data 240).

Additionally, in some instances, participant block generation module 236 may package the encrypted portions of payment instruction information 208 and rich transaction remittance data 210 (e.g., which are accessible to regulatory system 172 in decrypted form) into a corresponding portion of an element 262 of third participant-specific data block 260 associated with regulatory system 172, e.g., as encrypted transaction data 264. As described herein, participant block generation module 236 may also associate correlation identifier 230 with encrypted transaction data 264, and package correlation identifier 230 into element 262. Further, participant block generation module 236 may generate, and package into an additional portion of third participant-specific data element 262, data access control information 266 that enables regulatory system 172 to establish an integrity and authenticity of both element 262 and encrypted participant data 264.

By way of example, participant block generation module 236 may apply a digital signature to correlation identifier 230 and to encrypted transaction data 264, e.g., using on any appropriate digital-signature algorithm based on the private cryptographic key of payer transaction system 122. In some instances, participant block generation module 236 may package the digitally signed correlation identifier 230 and encrypted transaction data 264 into data access control information 266, along with the public key certificate of regulatory system 172 (e.g., extracted from certificate data 242C) and the public key certificate of payer transaction system 122 (e.g., as extracted from payer cryptographic data 240).

Further, based on an application of the portions of participant accessibility data 238 to each additional or alternate element of correlated transaction data 232, participant block generation module 236 may perform any of the exemplary processes described herein to identify participant-specific portions of payment instruction information and rich transaction remittance data associated with corresponding ones of the additional payment transactions involving payer 101 and various counterparties. In some instances, participant block generation module 236 performs any of the exemplary processes described herein to generate additional elements of first participant-specific data block 244 (e.g., associated with payee device 112), second participant-specific data block 252 (e.g., associated with payee transaction system 142), and third participant-specific data block 260 (e.g., associated with regulatory system 172) based on corresponding ones of the identified participant-specific portions of payment instruction information and rich transaction remittance data. As illustrated in FIG. 2B, participant block generation module 236 may package first participant-specific data block 244, second participant-specific data block 252, and third participant-specific data block 260 into one or more recordation requests 268, and may perform operations that cause payer transaction system 122 to broadcast each of one or more recordation requests 268 across network 120 to each of peer systems 180.

Figure 2C:
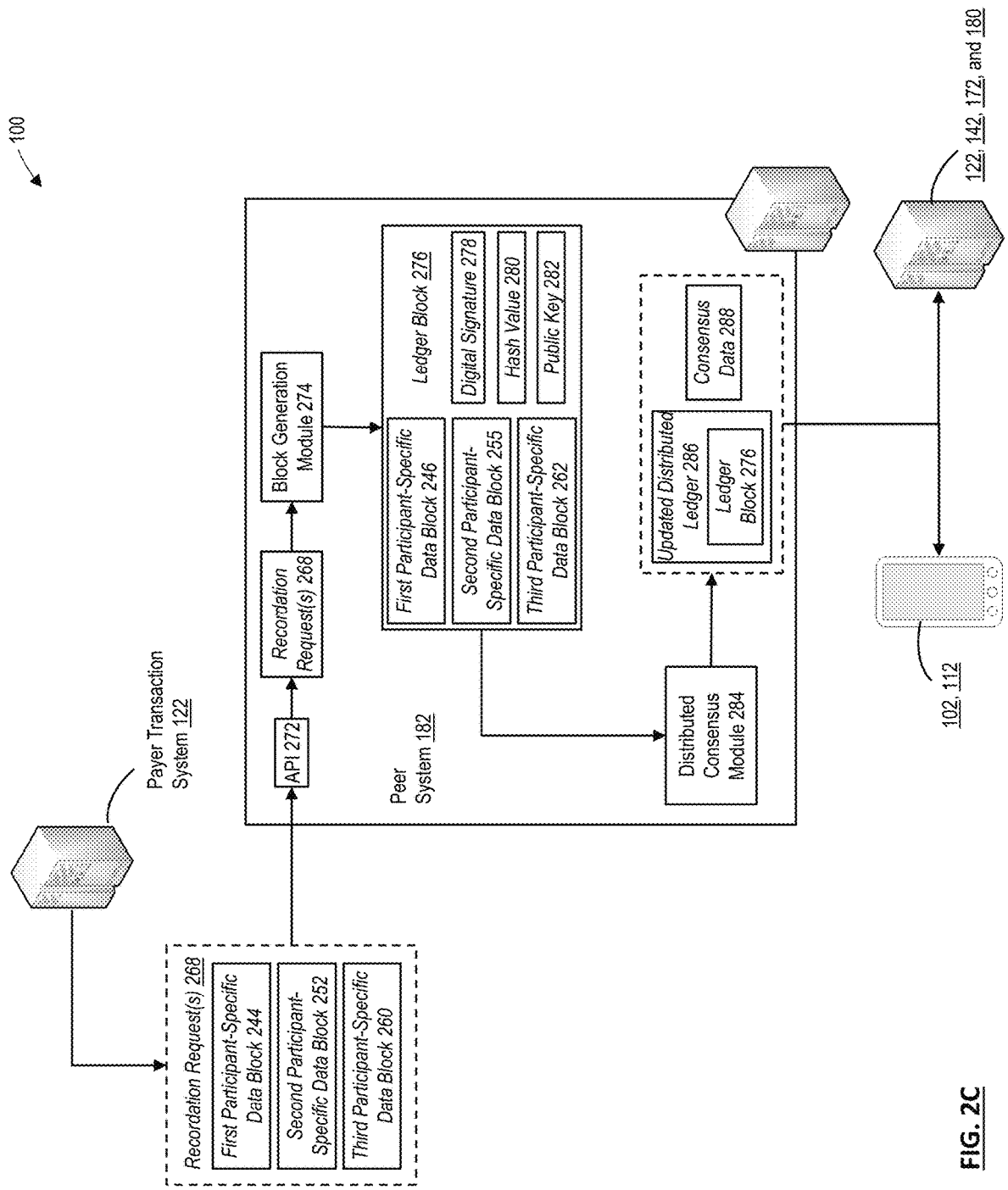

Referring to FIG. 2C, peer system 182 (and each additional or alternate one of peer systems 180) may receive the one or more recordation requests 268, which include first participant-specific data block 244, second participant-specific data block 252, and third participant-specific data block 260 through a corresponding programmatic interface. In one instance, peer system 182 (and each additional or alternate one of peer systems 180) may receive a single one of recordation requests 268 that includes each of first participant-specific data block 244, second participant-specific data block 252, and third participant-specific data block 260, and the information that uniquely identifies payer transaction system 122 (e.g., the IP address, etc.) and/or executed transaction engine 214 (e.g., the application cryptogram). In other instances, not depicted in FIG. 2C, peer system 182 (and each additional or alternate one of peer systems 180) may receive multiple ones of recordation requests 268, each of which include one or more of first participant-specific data block 244, second participant-specific data block 252, and third participant-specific data block 260.

By way of example, a programmatic interface of peer system 182 (and each additional or alternate one of peer systems 180), such as application programming interface (API) 272 may the one or more recordation requests 268, which includes first participant-specific data block 244, second participant-specific data block 252, and third participant-specific data block 260, and may route recordation request(s) 268 to a block generation module 274. When executed by the one or more processors of peer system 182 (and each additional or alternate one of peer systems 180), block generation module 274 may perform operations that generate a new ledger block 276 that includes first participant-specific data bock 244, second participant-specific data block 252, and third participant-specific data block 260.

For instance, block generation module 274 perform operations that generate a digital signature 278 based on the first participant-specific data bock 244, second participant-specific data block 252, and third participant-specific data block 260 (e.g., using a corresponding private cryptographic key of peer system 182 maintained within cryptographic library 184), and may generate a hash value 280 based on an application of any appropriate hash algorithm described herein to the first participant-specific data bock 244, second participant-specific data block 252, third participant-specific data block 260, and digital signature 278, either alone or in conjunction with a corresponding public cryptographic key 282. In some instances, block generation module 274 may package first participant-specific data bock 244, second participant-specific data block 252, and third participant-specific data block 260 into ledger block 276, along with digital signature 278, hash value 280, and public cryptographic key 282.

Peer system 182 (and each additional or alternate one of peer systems 180) may perform additional operations that append to ledger block 276 to a prior version of the permissioned distributed ledger to generate a latest, longest version of the permissioned distributed ledger (e.g., an updated distributed ledger 286). For example, the additional operations may be established through a distributed consensus among additional ones of peer systems 180, and may include, but are not limited to, the calculation of an appropriate proof-of-work or proof-of-stake by a distributed consensus module 284 prior to the other peer systems. In certain aspects, peer system 152 may broadcast evidence of the calculated proof-of-work or proof-of-stake to the additional ones of peer systems 180 across network 120 (e.g., as consensus data 288).

Peer system 182 may also broadcast updated distributed ledger 286, which represents the latest, longest version of the distributed ledger, to the additional ones of peer systems 180 operating within environment 100 and additionally or alternatively, to each of the network-connected systems that participate in the blockchain network, such as payer device 102, payer transaction system 122, payee device 112, payee transaction system 142, and/or regulatory system 172, through a secure, programmatic interface. In some instances, not illustrated in FIG. 2C, payee device 112 may perform operations that store updated distributed ledger 286 within corresponding portion of the one or more tangible, non-transitory memories, and each of payer transaction system 122, payee transaction system 142, and/or regulatory system 172 may perform operations that store updated distributed ledger 286 within respective portions of data repository 123, data repository 143, and/or data repository 173, e.g., to replace corresponding ones of distributed ledger 190.

In some exemplary embodiments, the recordation of participant-specific portions of elements of correlated transaction data 232 within one or more ledger blocks of distributed ledger 286 may enable payee device 112, payee transaction system 142, regulatory system 172, and other participants in the permissioned distributed-ledger network to access participant-specific transaction data structured in or consistent with a standardized data-interchange format, such as participant-specific portions of rich transaction remittance data 210 structured in accordance with the ISO 20022™ standard data-interchange format, while facilitating an execution, settlement, and clearance of the corresponding payment transactions via a legacy transaction processing network associated with a legacy data-interface format.

Furthermore, certain participants in the permissioned distributed-ledger network, such payer transaction system 122 or payee transaction system 142, may receive data characterizing a current status of one or more of the payment transactions within the execution, settlement, and clearance process, such as, but not limited to, a data confirming a "paid" status of the requested bill-payment transaction that satisfies the outstanding invoice from payee 111. As described below, and responsive to the receipt of the status data, payee transaction system 142 (or other participants in the permissioned, distributed-ledger network) may package a corresponding portion of the participant-specific transaction data and the newly received status data into a recordation request. In some instances, payee transaction system 142 may broadcast the recordation request across network 120 to each of peer systems 180, such as peer system 182, which may perform any of the exemplary consensus-based processes described herein to record the portion of the participant-specific transaction data and the newly received status data within an additional ledger block of the permissioned distributed ledger, e.g., to generate an updated distributed ledger that reflects the paid status of the requested bill-payment transaction.

As described herein, peer system 182 (or an additional, or alternate, one of peer systems 180) may perform operations that distribute the now-updated distributed ledger and data characterizing the computed proof-of-work or proof-of-stake not only to other ones of peer systems 180, but also to each of the participants in the permissioned distributed-ledger network, for local storage within a corresponding, non-tangible memories. In some instances, one or more of the participants, such as payee device 112, payee transaction system 142, or regulatory system 172, may access the locally maintained and updated distributed ledger and identify one or more encrypted elements of the participant-specific transaction data that reference a corresponding public key certificate and additionally, or alternatively, that reference a correlation identifier associated with a particular payment transaction. Using a corresponding private cryptographic key, the one or more of the participants may decrypt the encrypted elements of the participant-specific transaction data, and perform operations on the decrypted elements of the participant-specific transaction data, e.g., to confirm a consistency between a paid transaction amount and an invoiced transaction amount and/or any payment advice, or to monitor one or more settled payment transactions for consistency with underlying payment instruction information or regulatory restrictions.

Figure 3A:
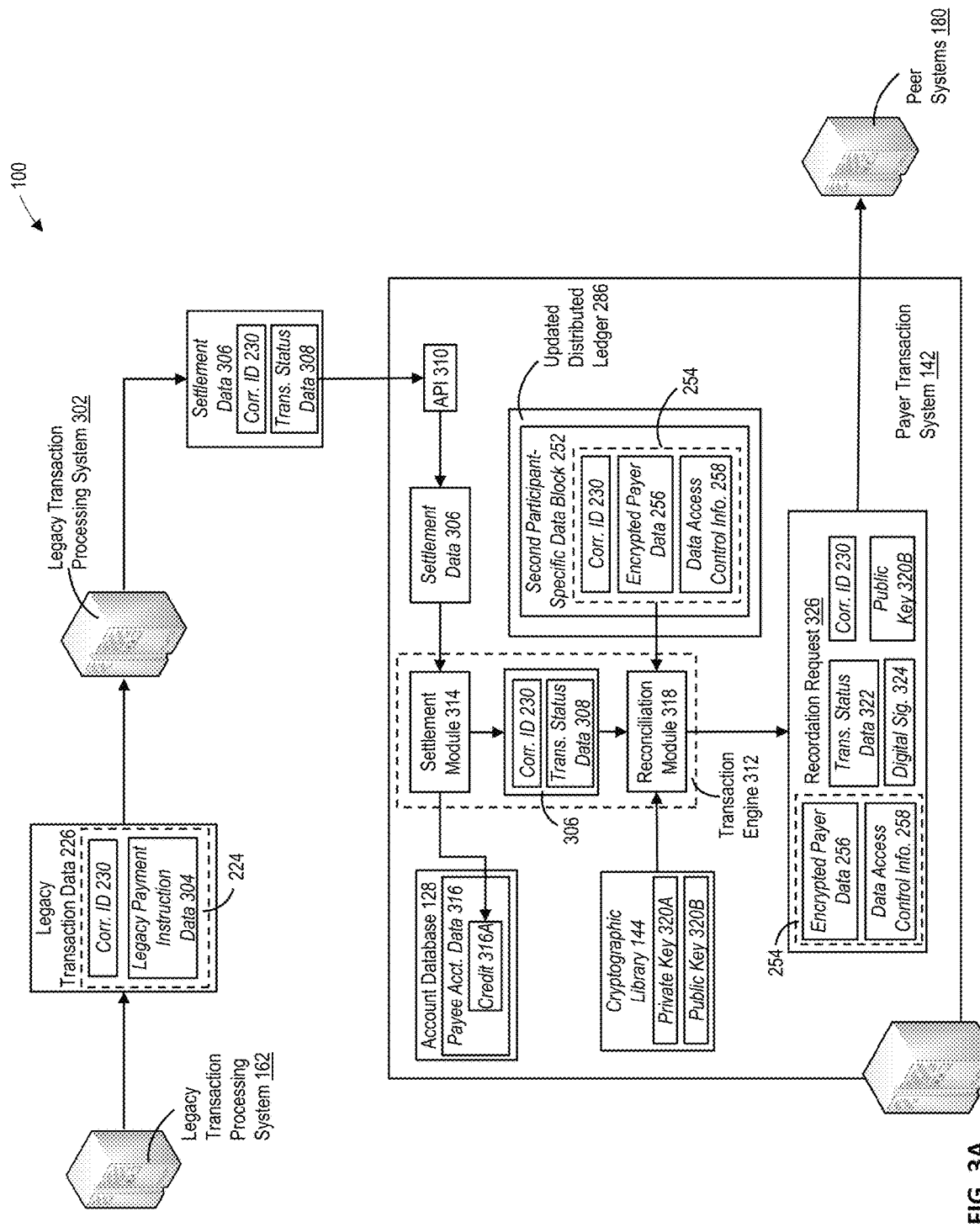

Referring to FIG. 3A, legacy transaction processing system 162 may perform operations that execute, clear, and settle each of requested payment transactions in accordance with the elements of legacy transaction data 226 in conjunction with one or more additional computing systems associated with the legacy transaction processing network, such as, but not limited to, legacy transaction processing system 302. By way of example, legacy transaction processing system 302 may be associated with payee transaction system 142 and may provide a programmatic entry point that facilitates interaction between payee transaction system 142 and the legacy transaction processing network, and may be in communication with payee transaction system 142, legacy transaction processing system 162, and other network-connected systems and devices operating within environment 100 across network 120.

For example, to implement the exemplary execution, clearance, and settlement processes described herein, legacy transaction processing system 162 may transmit legacy transaction data 226 across network 120 to legacy transaction processing system 302. As described herein, each element of legacy transaction data 226 may include legacy payment instruction information identifying and characterizing a corresponding payment transaction (e.g., parameter values of the corresponding payment transaction, such as, but not limited to, a transaction amount, a transaction date or time, and identifiers of source and destination accounts) and a correlation identifier associated with or assigned to the corresponding payment transaction. In some instances, legacy transaction processing system 162 and legacy transaction processing system 302 may perform individual or collective operations that, for each of element of legacy transaction data 226, execute, settle, and clear the corresponding payment transaction in accordance with parameter values specified within the legacy payment instruction information.

By way of example, element 224 of legacy transaction data 226 may correspond to the requested bill-payment transaction that satisfies the outstanding invoice from payee 111, and may include correlation identifier 230 and legacy payment instruction information 304 that includes parameter values characterizing the requested bill-payment transaction. As described herein, the parameter values may include, but are not limited to, a transaction amount (e.g., $15,000), the transaction date or time (e.g., a predetermined period prior to the due date of March 20$^{th}$), the identifier of the source account (e.g., the account and/or routing number of the payer account issued by the payer financial institution), and the identifier of the destination account (e.g., the account and/or routing number of the payee account issued by the payee financial institution).

Based on the parameter values included within legacy payment instruction information 304, legacy transaction processing systems 162 and 302 may perform collective operations that execute, settle, and clear an electronic transfer of the $15,000 in funds from the payer account to the payee account (e.g., that debit $15,000 (and any corresponding fee) from the payer account and credit $15,000 to the payee account), and may transmit data indicative of the cleared and settled bill-payment transaction to each of payer transaction system 122 and payee transaction system 142. For example, as illustrated in FIG. 3A, legacy transaction processing system 302 may generate settlement data 306 that includes, among other things, correlation identifier 230 and transaction status data 308 that confirms the execution of the requested bill-payment transaction and electronic transfer of the $15,000 into the payer account at the payer financial institution), and transmit settlement data 306 across network 120 to payee transaction system 142.

A programmatic interface maintained by payee transaction system 142, such as application programming interface (API) 310, may receive settlement data 306, and may route settlement data 306 to a corresponding settlement module 314 of a transaction engine 312 executed by the one or more processors of payee transaction system 142. In some instances, settlement module 314 may access data records 316 of account database 146, which identify and characterize the payee account involved in the cleared and settled bill-payment transaction, and modify accessed data records 316 to include credit data 316A indicative of the $15,000 credit to the payee account resulting from the cleared and settled bill-payment transaction.

Further, as illustrated in FIG. 3A, settlement module 314 may also provide all or a portion of settlement data 306 as an input to a reconciliation module 318, which may perform operations that establish a consistency between portions of settlement data 306 and portions of the participant-specific transaction immutably recorded onto the ledger blocks of the permissioned distributed ledger, and that update the permissioned distributed ledger to reflect the execution, clearance, and settlement of the requested bill-payment transaction. For example, reconciliation module 318 may access cryptographic library 144 (e.g., as maintained within data repository 143), and may extract private cryptographic key 320A and corresponding public key certificate 320B associated with payee transaction system 142 and as such, with the payer financial institution.

Further, reconciliation module 318 may also access a locally stored copy of the permissioned distributed ledger, e.g., updated distributed ledger 286 maintained within data repository 143, and to identify a corresponding element of participant-specific transaction data that includes or reference public key certificate 320B (e.g., that is accessible to payee transaction system 142) and further, that includes or references correlation identifier 230 (e.g., that characterizes the requested bill-payment transaction). By way of example, reconciliation module 318 may identify, within the ledger blocks of updated distributed ledger 286, element 254 of second participant-specific data block 252 that includes correlation identifier 230, encrypted transaction data 256 (e.g., the encrypted copy of rich transaction remittance data 210), and data access control information 258 (e.g., the digital signature applied to correlation identifier 230 and encrypted transaction data 256, public key certificate 320B, and the public key certificate of payer transaction system 122, etc.). As described herein, element 254 may include encrypted information that characterizes the requested bill-payment transaction (e.g., due to the inclusion of correlation identifier 230) and further, that is accessible to payee transaction system 142 (e.g., due to the inclusion of public key certificate 320B).

In some instances, reconciliation module 318 may perform operations that validate the digital signature and based on the validated digital signature, that decrypt encrypted transaction data 256 using private cryptographic key 320A of payee transaction system 142. As described herein, the decrypted portions of encrypted transaction data 256 may include all or a portion of rich transaction remittance data 210 (e.g., a digital image of the invoice, payment advice characterizing a discrepancy between the invoiced and paid amounts, etc.). Based on portions of transaction status data 308, reconciliation module 318 may confirm that the executed, cleared, and settled bill-payment transaction, and the electronic transfer of the $15,000 into the payer account at the payer financial institution, is consistent with the portions of rich transaction remittance data 210.

Reconciliation module 318 may perform operations that, for example, generate transaction status data 322 that confirms the executed, cleared, and settled status of the bill-payment transaction (e.g., by establishing a value of "PAID" for a status flag within generated transaction status data 322), and package correlation identifier 230, element 254 of second participant-specific data block 252, and generated transaction status data 322 into corresponding portions of recordation request 326. In other instances, if reconciliation module 318 were to establish an inconsistency between that the executed, cleared, and settled bill-payment transaction (and the electronic transfer of the $15,000 into the payer account at the payer financial institution) and the portions of rich transaction remittance data 210, reconciliation module 318 may package additional information that characterizes the established inconsistency within transaction status data 322.

Further, reconciliation module 318 may also perform any of the exemplary processes described herein to apply a digital signature 330 to correlation identifier 230, element 254 of second participant-specific data block 252, and transaction status data 322 (e.g., using private cryptographic key 320A). Reconciliation module 318 may package digital signature 330 and public key certificate 320B of payee transaction system 142 into corresponding portions of recordation request 326, and may perform operations that cause payee transaction system 142 to transmit recordation request 326 across network 120 to each of peer systems 180, include peer system 182.

Figure 3B:
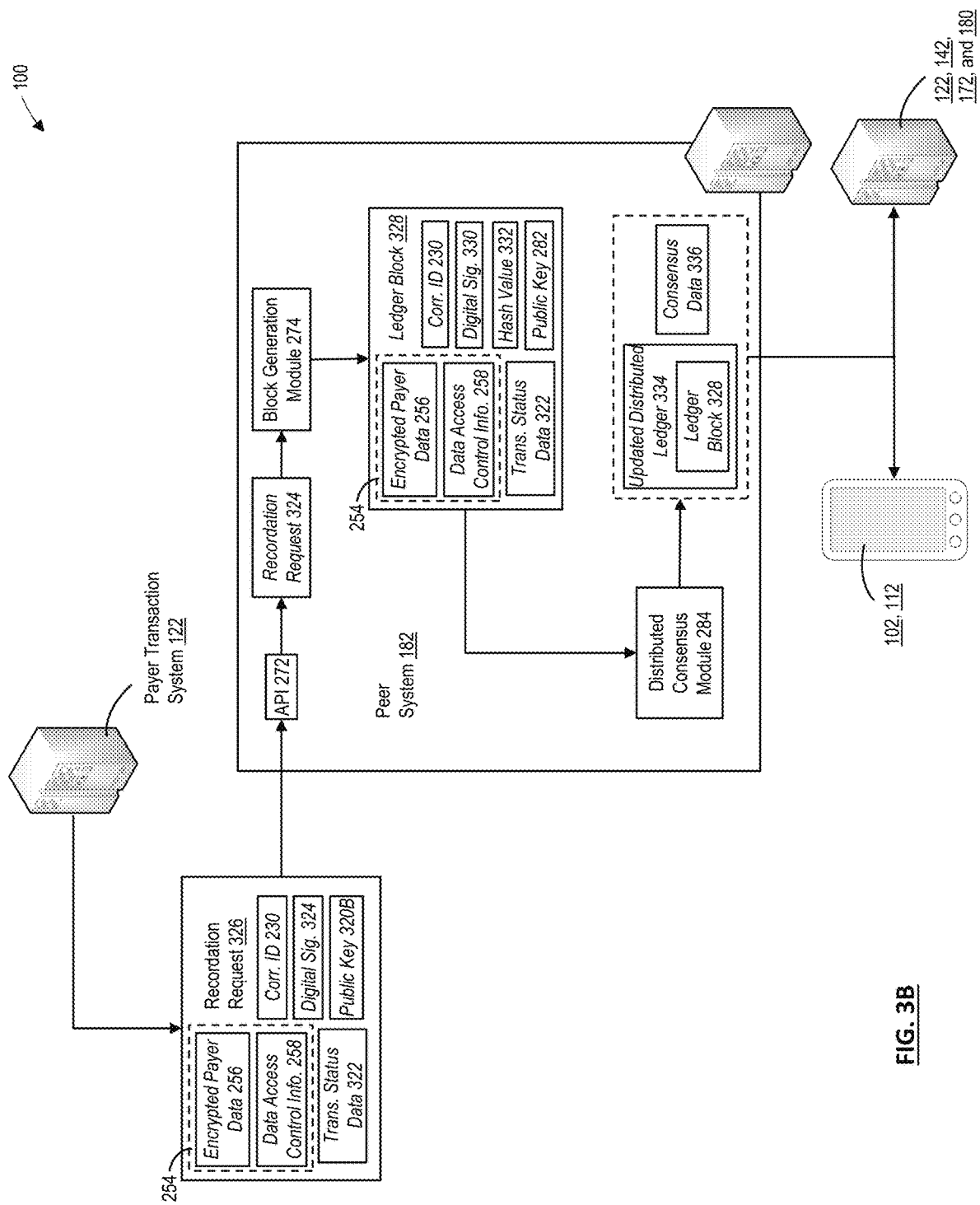

Referring to FIG. 3B, API 272 of peer system 182 may receive recordation request 326, and may route message 270 to block generation module 247. When executed by the one or more processors of peer system 182 (and each additional or alternate one of peer systems 180), block generation module 274 may perform any of the exemplary processes described herein to generate a new ledger block 328 that includes correlation identifier 230, element 254 of second participant-specific data block 252, and transaction status data 322.

For instance, block generation module 274 perform operations that generate a digital signature 330 based on (e.g., using the private cryptographic key of peer system 182), and may generate a hash value 332 based on an application of any appropriate hash algorithm described herein to correlation identifier 230, element 254 of second participant-specific data block 252, transaction status data 322, and digital signature 330, either alone or in conjunction with public cryptographic key 282. In some instances, block generation module 274 may perform additional operations that package correlation identifier 230, second participant-specific data block 252, and transaction status data 322 into ledger block 328, along with digital signature 330, hash value 332, and public cryptographic key 282.

Peer system 182 (and each additional or alternate one of peer systems 180) may perform additional operations that append ledger block 328 to a prior version of the permissioned distributed ledger to generate a latest, longest version of the permissioned distributed ledger (e.g., an updated distributed ledger 334 that reflects the executed, cleared, and settled status of the requested bill-payment transaction related to the invoice generated by payee 111). For example, the additional operations may be established through a distributed consensus among additional ones of peer systems 180, and may include, but are not limited to, the calculation of an appropriate proof-of-work or proof-of-stake by a distributed consensus module 284 prior to the other peer systems. In certain aspects, peer system 182 may broadcast evidence of the calculated proof-of-work or proof-of-stake to the additional ones of peer systems 180 across network 120 (e.g., as consensus data 336).

Peer system 182 may also broadcast updated distributed ledger 334, which represents the latest, longest version of the distributed ledger, to the additional ones of peer systems 180 operating within environment 100 and additionally or alternatively, to each of the network-connected systems that participate in the blockchain network, such as payer transaction system 122, payee device 112, payee transaction system 142, and/or regulatory system 172, through a secure, programmatic interface. In some instances, not illustrated in FIG. 2C, payee device 112 may perform operations that store updated distributed ledger 334 within corresponding portion of the one or more tangible, non-transitory memories, and each of payer transaction system 122, payee transaction system 142, and/or regulatory system 172 may perform operations that store updated distributed ledger 334 within respective portions of data repository 123, data repository 143, and/or data repository 173, e.g., to replace corresponding ones of updated distributed ledger 286.

In some examples, one or more of the exemplary permissioned distributed ledger described herein, such as, but not limited to, permissioned distributed ledger 190 and updated distributed ledgers 286 and 334, may immutable record participant-specific elements of transaction data that characterize one or more payment transactions and a status of these payment transactions within an execution, clearance, and settlement process implemented by a legacy transaction processing network. For instance, payer transaction system 122 may perform any of the exemplary processes described herein (e.g., via participant block generation module 236 of executed transaction engine 214) to generate element 254 of second participant-specific data block 252 that includes, among other things, an encrypted copy of rich transaction remittance data 210, which may be accessible to payee transaction system 142.

Payer transaction system 122 may broadcast second participant-specific data block 252 to each of peer systems 180, e.g., either individually or in conjunction with first participant-specific data block 244 and/or third participant-specific data block 260, and peer systems 180 may perform any of the consensus-based processes described herein to record second participant-specific data block 252 (and additionally, or alternatively, first participant-specific data block 244 and third participant-specific data block 260) into a ledger block of an updated version of the permissioned distributed ledger, e.g., within ledger block 276 of updated distributed ledger 286. As described herein, payee transaction system 142 may access ledger block 276, identify element 254 of second participant-specific data block 252 based on correlation identifier 230 and/or public key certificate 3208, and decrypt the encrypted copy of rich transaction remittance data 210 for further processing.

The recordation of actual transaction data onto the ledger blocks of the exemplary permissioned distributed ledgers can, in some instances, impose a burden on certain systems operating within the permissioned distributed-ledger network described herein, as these participant systems must dedicate increasing amounts of local memory to maintaining updated versions of the permissioned distributed ledgers, e.g., that reflect statuses payment transactions executed, cleared, and settled by the legacy transaction processing network. Moreover, the ever-increasing length and size of the updated versions of the permissioned distributed ledger (e.g., that track the newly executed, cleared, and settled payment transactions) may reduce a speed and efficiency at which each of peer systems 180 generate new ledger blocks via the consensus-based processes described herein, and may result in a mismatch between data characterizing a current status of a payment transaction, as recorded onto the permissioned distributed ledger, and corresponding settlement advice generated and distributed by the legacy transaction processing network.

In other exemplary embodiments, certain ledger blocks of the exemplary permissioned distributed ledgers described herein may not record encrypted, participant-specific elements of actual transaction data, but may instead record a hash values representative of each participant-specific element of the actual transaction data in conjunction with encrypted data that identifies a storage location of the corresponding participant-specific element of the actual transaction data within one or more data repositories, such as, but not limited to, one or more cloud-based repositories. For instance, and in reference to FIG. 2B, payer transaction system 122 may perform operations that store the elements of correlated transaction data 232 not only within the data records of account database 128, but also that transmit the elements of correlated transaction data 232, including element 234 that characterizes the requested bill-payment transaction involving the outstanding invoice from payee 111, across network 120 to one or more computing systems associated with a cloud-based repository, e.g., via a secure programmatic interface.

The one or more computing systems may perform operations that store each of the elements of correlated transaction data 232 within a corresponding portion of the cloud-based repository, and may provide pointer data identifying a storage location of each of the elements of correlated transaction data 232 within the cloud-based repository to payer transaction system 122, e.g., across network 120 via the secure programmatic interface. Examples of the pointer data include, but are not limited to, an HTML file path, a uniform resource locator (URL), or other information that uniquely identifies a corresponding storage location within the cloud-based data repository.

Payer transaction system 122 may receive the pointer data, and store the pointer data in a corresponding portion of account database 128, e.g., in conjunction with correlated transaction data 232. In some instances, participant block generation module 236 may perform any of the exemplary processes described herein that identify, for each discrete element, a corresponding portion of correlated transaction data 232 accessible to the participants in the permissioned distributed-ledger network, such as, but not limited to, payee device 112, payee transaction system 142, and regulatory system 172. Participant block generation module 236 may also perform operations that compute a hash value representative of each identified participant-specific portion of correlated transaction data 232 (e.g., using any appropriate hash algorithm) and encrypt a portion of the pointer data that corresponds to each of the participant-specific portions of correlated transaction data 232 using an appropriate public cryptographic key (e.g., selected from the public cryptographic keys of payee device 112, payee transaction system 142, and regulatory system 172).

Participant block generation module 236 package each of the hash values and the encrypted portions of the pointer data into corresponding elements of first participant-specific data block 244, second participant-specific data block 252, and third participant-specific data block 260. By way of example, and as described herein, participant block generation module 236 may determine the rich transaction remittance data 210 is accessible to payee transaction system 142 and as such, to the payee financial institution. In some instances, participant block generation module 236 may compute a hash value representative of rich transaction remittance data 210, and package the computed hash value and the corresponding portion of the pointer data into element 254 of second participant-specific data block 252, which is accessible to payee transaction system 142 and is associated with the requested bill-payment transaction that satisfies the outstanding invoice from payee 111.

Participant block generation module 236 may then perform any of the exemplary processes described herein to broadcast first participant-specific data block 244, second participant-specific data block 252, and third participant-specific data block 260 across network 120 (e.g., within one or more of recordation requests 268) to peer systems 180, which may perform consensus-based processing to record each of first participant-specific data block 244, second participant-specific data block 252, and third participant-specific data block 260 within one or more additional ledger blocks of the permissioned distributed ledger. Certain of these exemplary processes, which immutable record hash values of actual transaction data and encrypted pointers to remote or cloud-based storage locations of the actual transaction data onto the permissioned distributed ledgers described herein, may be implemented in addition to, as an alternate to, or in conjunction with other exemplary processes that immutably record actual transaction data onto the permissioned distributed ledger, may reduce an amount of dedicated memory required to maintain a local copy of the permissioned distributed ledger at each participant in the permissioned distributed-ledger network, and may increase a speed and efficiency at which peer systems 180 perform the exemplary consensus-based processes described herein.

In some exemplary embodiments, a transaction engine executed by the one or more processors of payer transaction system 122 (e.g., validation module 216 of executed transaction engine 214) may perform operations that validate an accuracy and/or an authenticity of each of the discrete elements included within transaction data 204, e.g., prior to mapping the discrete elements of transaction data 204 into the legacy data-interface format and submitting corresponding elements of legacy transaction data 226 to the legacy transaction processing network for execution, clearance, and settlement of the associated payment transactions. Additionally, the legacy transaction processing network (e.g., the payment rail that facilitates a clearance and settlement of EFT transactions, AFT credit transactions, AFT debit transactions, etc.), may also enforce certain restrictions on payment instructions submitted for execution, clearance and settlement.

For example, the enforced restrictions may include one or more counterparty-specific restrictions, which restrict an ability of a payer to request an execution of certain types of payment transactions (e.g., EFT, AFT credit, AFT debit, etc.), or may impose a maximum value of one or more parameters that characterize the payment transactions (e.g., a maximum transaction amount, etc.) or a transactional behavior of the payer (e.g., a maximum transaction velocity during a corresponding time period). In other examples, the enforced restrictions may include one or more restrictions specific to a particular payment type, e.g., an EFT transaction or an AFT credit transaction, and may impose a maximum transaction amount or a maximum value of another parameter that characterizes a payment transaction of the particular payment type. The disclosed embodiments are, however, not limited to these exemplary counterparty-specific and payment-specific restrictions, and in other instances, the legacy transaction processing system may impose or enforce any additional or alternate restriction appropriate to the payment transactions, the payer or payee, the payer or payee financial institutions, or one or more regulatory or governmental entities, include restrictions specific to both particular counterparties and to particular types of payment transactions.

Further, in some instances, one or more of the imposed restrictions may evolve over time, e.g., in response to a behavior of a particular counterparty or a behavior of a collection of demographically or geographically similar counterparties. Further, the imposed or enforced restrictions may be established by the legacy transaction processing network, either alone or based on collaborative activity of the payer financial institution, the payee financial institution, and one or more governmental or regulatory entities, and may be reviewed or reevaluated at periodic intervals or in response to certain triggering events, such as a detection of fraudulent activity involving payer 101, payee 111, the payee or payer financial institutions, or particular types of payment transactions executed across the legacy transaction processing network.

By way of example, one or more computing systems operated by the legacy transaction processing network, such as legacy transaction processing system 162 of FIG. 1, may maintain local rules data that identifies and characterizes each of the imposed restrictions, e.g., within the one or more tangible, non-transitory memories. Based on the local rules data, legacy transaction processing system 162 (and the other computing systems operated by the legacy transaction processing network) may perform operations that enforce the imposed restrictions of each element of payment instruction information submitted for execution, clearance, and settlement.

In some instances, legacy transaction processing system 162 may be configured to receive request information from computing systems operated by stakeholders in the legacy transaction processing network (e.g., payer transaction system 122, payee transaction system 142, regulatory system 172, etc.) to establish new counterparty- or payment-specific restrictions, or to enhance or ease existing counterparty- or payment-specific restrictions. Although legacy transaction processing system 162 may be configured to update the locally maintained rules data in accordance with the request information, a current state of the locally maintained rules data may not transparent to one or more stakeholder computing systems, and legacy transaction processing system 162 must ensure that the newly updated rules data is distributed among other computing systems operated by the legacy transaction processing network is a consistent and reliable manner. Further, despite maintaining local copies of the rules data, legacy transaction processing system 162 and the other computing systems operated by the legacy transaction processing network may provide no immutable, auditable record of the imposed restrictions or their time evolution.

In some exemplary embodiments, one or more ledger blocks of a permissioned described ledger may immutably record rules data characterizing each of the imposed counterparty- and payment-specific restrictions imposed on legacy transaction data by legacy transaction processing system 162 and by computer systems operated by other stakeholders in the legacy transaction processing network, such as, but not limited to payer transaction system 122, payee transaction system 142, or regulatory system 172. Legacy transaction processing system 162 and/or any of the stakeholder systems described herein may generate and broadcast, across network 120 to each of peer systems 180, elements of the request information that, for example, request an establishment of a new counterparty- or payment-specific restriction, or request a modification of an existing counterparty- or payment-specific restriction.

In some instances, peer systems 180 may perform any of the exemplary consensus-based processes described herein to record, within an additional ledger block of the permissioned distributed ledger, data that establishes the requested counterparty- or payment-specific restriction or that modifies the existing counterparty- or payment-specific restriction in accordance with the elements of the request information. By recording the data that establishes or modifies the imposed counterparty- or payment-specific restrictions within the permissioned distributed ledger, certain of the disclosed exemplary embodiments may establish a cryptographically secure, immutable, and auditable record of not only the imposition of new counterparty- or payment-specific restrictions, but also time evolution of these imposed restrictions that is transparent and visible to all participants in the permissioned distributed-ledger network described herein.

In some exemplary embodiments, and in addition to ledger blocks that record and track the imposed counterparty- and payment-specific restrictions, the permissioned distributed ledger may also include one or more ledger blocks that record executable elements of code, such as software modules or executable scripts. When executed by the peer systems 180 in conjunction with supporting data, the executed code elements may cause peer systems 180 to perform operations consistent with a distributed smart contract, which in some instances, applies the recorded rules data to one or more elements of structured transaction data received from a participant system in the permissioned distributed-ledger network, and based on consensus-based processes, determine whether each of the elements of structured transaction data conforms to the imposed counterparty- or payment-specific restrictions and broadcast a response to the participant system that reflects the determined, as described below in reference to FIGS. 4A and 4B.

Figure 4A:
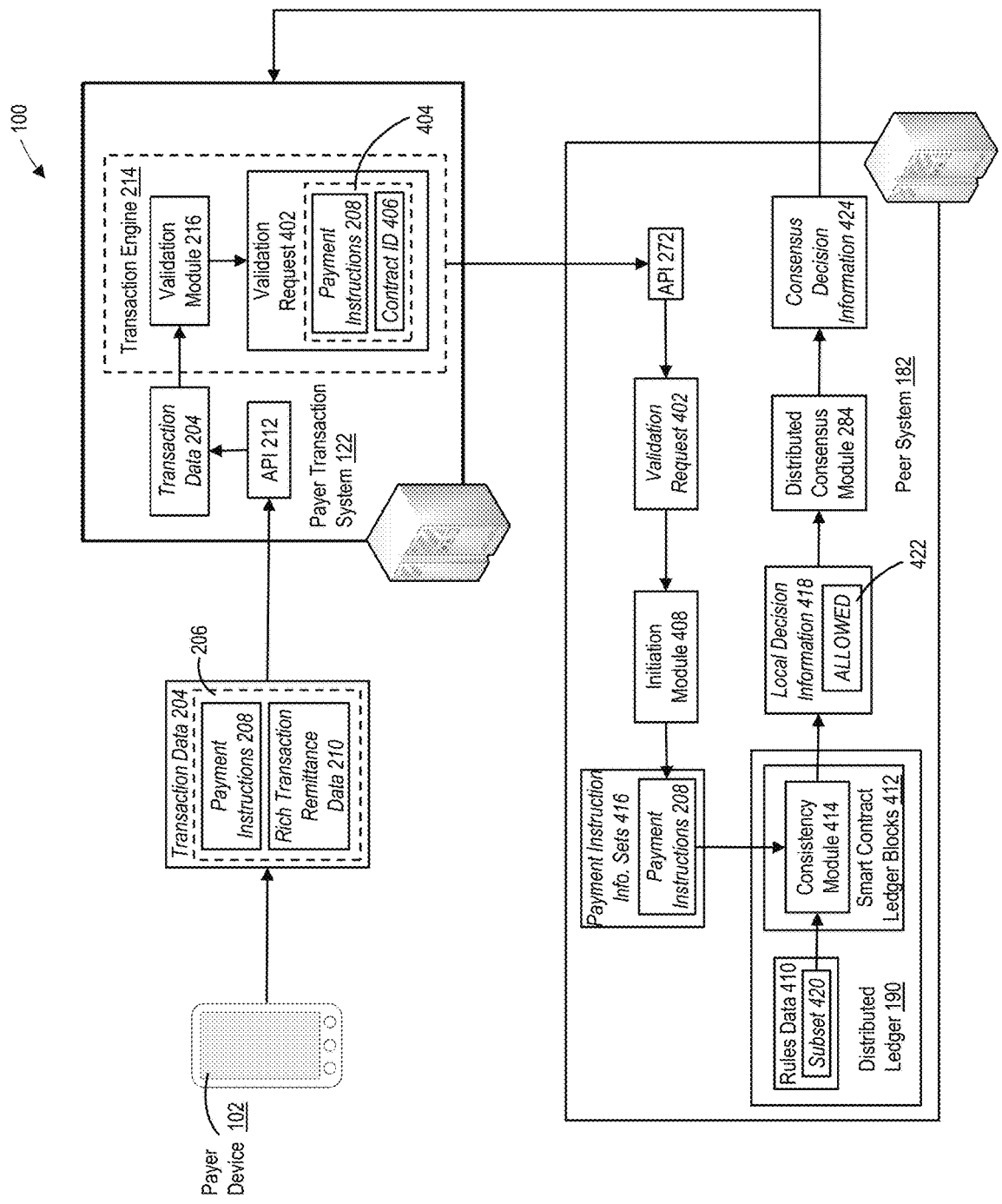

Referring to FIG. 4A, API 212 of payer transaction system 122 may receive transaction data 204 from payer device 102, e.g., across network 120 using any appropriate communications protocol. In some instances, transaction data 204 may include one or more discrete elements of transaction data, such as, but not limited to transaction data element 206 associated with the requested bill-payment transaction that satisfies the outstanding invoice from payee 111. Each of the elements of transaction data 204, including transaction data element 206, may be structured in accordance with the ISO 20022™ standard data-interchange format, and may include payment instruction information specifying values of parameters that characterize the corresponding payment transaction and rich transaction remittance data associated with corresponding payment transaction.

By way of example, and as described herein, transaction data element 206 may include payment instruction information 208 and rich transaction remittance data 210, each of which characterize the requested bill-payment transaction that satisfies the outstanding invoice from payee 111. Further, each of the elements of transaction data 204, including transaction data element 206, may also include additional information that identifies payer 101 (e.g., the login credential) and/or payer device 102 (e.g., the IP address, and/or executed payment application 202 (e.g., the application cryptogram)

In some instances, API 212 may route transaction data 204 to validation module 216 of executed transaction engine 214, which may perform any of the exemplary processes described herein to validate the application cryptogram and/or the information identifying payer 101 and/or payer device 102. Validation module 216 may also perform operations that, for each element of transaction data 204, extract the payment instruction information and package the now-extracted payment instruction information into a corresponding element of a validation request 402. For example, as illustrated in FIG. 4A, validation module 216 may extract payment instruction information 208 from transaction data element 206, and package payment instruction information 208 into element 404 of validation request 402.

Further, as illustrated in FIG. 4A, validation module 216 may also package a unique identifier 406 of the distributed smart contract within the permissioned distributed-ledger (e.g., a network address associated with the smart contract ledger blocks, as described herein) within a portion of validation request 402. In some instances, validation module 216 may perform operations that obtain a unique network address of each of peer systems 180, such as an IP address of peer system 182, and perform operations that cause payer transaction system 122 to broadcast validation request 402, including element 404 characterizing the requested bill-payment transaction associate with the outstanding invoice from payee 111, across network 120 to each of peer systems 180, including peer system 182.

Peer system 182 (and each additional or alternate one of peer systems 180) may receive validation request 402 through a corresponding programmatic interface, such as API 272. In some instances, API 272 may route validation request 402 to an initiation module 408, which may process validation request 402 to detect a presence of contract identifier 406, e.g., that uniquely identifies the distributed smart contract within distributed ledger 190 maintained within data repository 183. As described herein, distributed ledger 190 may record, within one or more ledger blocks, rules data 410 that identifies and characterizes one or more counterparty- or payment-specific restrictions currently impose to transaction data elements submitted to legacy transaction processing system 162 for execution, clearance, and settlement, and that tracks an evolution of these application imposed.

In further instances, also described herein, distributed ledger 190 may also include one or more ledger blocks recording elements of code, such as software modules or executable scripts, that, when executed by the peer system 182 (and additional ones of peer systems 180) in conjunction with supporting data, perform operations consistent with a distributed smart contract (e.g., smart contract ledger blocks 412). By way of example, smart contract ledger blocks 412 may include a consistency module 414 that, when executed by peer system 182 and additional ones of peer systems 180 (e.g., by one or more processors or through an instantiated virtual machine), performs operations that, for a received element of transaction data characterizing a corresponding payment transaction, apply the one or more counterparty- or payment-specific restrictions maintained in rules data 410 to the received transaction data element and determine whether the corresponding payment transaction is consistent with the one or more counterparty- or payment-specific restrictions.

Referring back to FIG. 4A, and in response to the detection of contract identifier 406, initiation module 408 may perform operations that invoke the distributed smart contract and thus, the execution of the code elements that establish the distributed smart contract, e.g., as maintained within consistency module 414 of smart contract ledger blocks 412. In some instances, one or more processors of peer system 182 may access distributed ledger 190 (e.g., as maintained within data repository 183) and execute the code elements maintained within consistency module 414. In other instances, and consistent with the disclosed embodiments, peer system 182 may execute an instance of a distributed virtual machine, which accesses the distributed ledger and executes the code elements maintained within consistency module 414 (e.g., based on output data generated by initiation module 408).

In some instances, and upon invocation of the distributed smart contract, initiation module 408 may extract one or more sets 416 of payment instruction information from corresponding elements of validation request 402, and provide each of extracted payment instruction information sets 416 as inputs to consistency module 414. For example, as illustrated in FIG. 4A, initiation module 408 may extract, from element 404 of validation request 402, payment instruction information 208 that identifies and characterizes the requested bill-payment transaction associated with the outstanding invoice issued by payee 111, and provide payment instruction information 208 as an input to consistency module 414.

As described herein, payment instruction information 208 may include a value of one or more parameters that characterize the requested bill-payment transaction associated with the outstanding invoice issued by payee 111. Examples of these parameter values include, but are not limited to, a transaction type, a transaction amount (e.g., the outstanding $15,000 balance, etc.), a transaction date or time (e.g., a predetermined or specified time prior to the due date of March 20$^{th}$, such as seven days), a payer identifier (e.g., the account number of payer 101), an identifier of a source account (e.g., a routing and/or account number of a deposit account held by payer 101 at the payer financial institution) and additionally, or alternatively, an identifier of a destination account (e.g., the routing and/or account number of supplier at the payee financial institution, as specified within the invoice). Further, each additional one of extracted payment instruction information sets 416 may include similar parameters values characterizing corresponding payment transactions, and each of extracted payment instruction information sets 416 may be structured in accordance with the ISO 20022™ standard data-interchange format.

Executed consistency module 414 may receive extracted payment instruction information sets 416 from initiation module 408, and may perform operations that access elements of rules data recorded onto permissioned distributed ledger 190, e.g., rules data 410. In some instances, and for each of extracted payment instruction information sets 416, consistency module 414 may identify a subset of the counterparty- or payment-specific restrictions application to the corresponding payment transaction, and determine whether the parameter values specified within the corresponding one of extracted payment instruction information sets 416 are consistent with the subset of the applicable counterparty- or payment-specific restrictions.

Further, consistency module 414 may generate output data characterizing the determined consistency between each of extracted payment instruction information sets 416 and the corresponding subset of the applicable counterparty- or payment-specific restrictions, and package the generated elements of output data into corresponding portions of local decision information 418. By way of example, each of the generated elements of the output data may include binary alphanumeric output indicative of the determined consistency, e.g., including a "1" or a text string "ALLOWED" in response to a determined consistency, or a "0" or "DECLINED" in response to a determined inconsistency.

By way of example, as illustrated in FIG. 4A, consistency module 414 may extract, from payment instruction information sets 416, payment instruction information 208 that characterizes the requested bill-payment transaction associated with the outstanding invoice issued by payee 111. In some instances, consistency module 414 may perform operations that extract, from rules data 410, a subset 420 of the counterparty- or payment-specific restrictions that are consistent with the transaction type or the payer or payee associated with the requested bill-payment transaction. For example, the subset of the counterparty- or payment-specific restrictions may identify a maximum transaction value of $25,000 for the sec (e.g., a payment-specific restriction) and one or more excluded counterparties, such as business entities associated with reported fraudulent activity or questionable business practices (e.g., a counterparty-specific restriction).

In some instances, consistency module 414 may apply the counterparty- or payment-specific restrictions specified within subset 420 to payment instruction information 208, and may generate output data 422 indicative of the determined consistency or inconsistency. For example, consistency module 414 that the transaction value specified within payment instruction information 208 (e.g., $15,000) is consistent with the specified maximum transaction value, and that the excluded counterparties do not include the payee specified within payment instruction information 208. Consistency module 414 may establish that payment instruction information 208 is consistent with subset 420 of the counterparty- or payment-specific restrictions, and may generate output data 422 indicative of the determined consistency, e.g., that the requested bill-payment transaction is "ALLOWED," and may package output data 422 into a corresponding portion of local decision information 418.

As illustrated in FIG. 4A, consistency module 414 may output local decision information 418, and a distributed consensus module 284 executed by peer system 182 may perform any of the consensus-based processes described herein to establish, in conjunction with additional ones of peer systems 180, a consensus decision regarding the consistency of each element of extracted payment instruction information sets 416, including payment instruction information 208, with the counterparty- or payment-specific restrictions recorded within rules data 410. For example, distributed consensus module 284 may broadcast local decision information 418 to each additional one of peer systems 180 across network 120 (e.g., alone or in conjunction with a computed proof-of-work or proof-of-stake), and each of peer systems 180 may perform consensus-based operations that establish the consensus decision when, among other things, each (or a predetermined subset) of peer systems 180 generate mutually consistent elements of local decision information.

As illustrated in FIG. 4A, executed distributed consensus module 284 may generate consensus decision information 424 that reflects the consensus established between peer systems 180 regarding the consistency of each element of extracted payment instruction information sets 416 with the counterparty- or payment-specific restrictions recorded within rules data 410. In some instances, the elements of consensus decision information 424 may be identical to the corresponding elements of local decision information 418, e.g., that the local decision established by peer system 182 corresponds to the consensus decision. In other instances, one or more elements of consensus decision information 424 may differ from the corresponding elements of local decision information 418, e.g., that the local decision may differ in whole, or in part, from the consensus decision. In some instances, executed distributed consensus module 284 may perform operations that cause peer system 182 to transmit consensus decision information 424 across network 120 to payer transaction system 122, e.g., as a response to validation request 402.

Figure 4B:
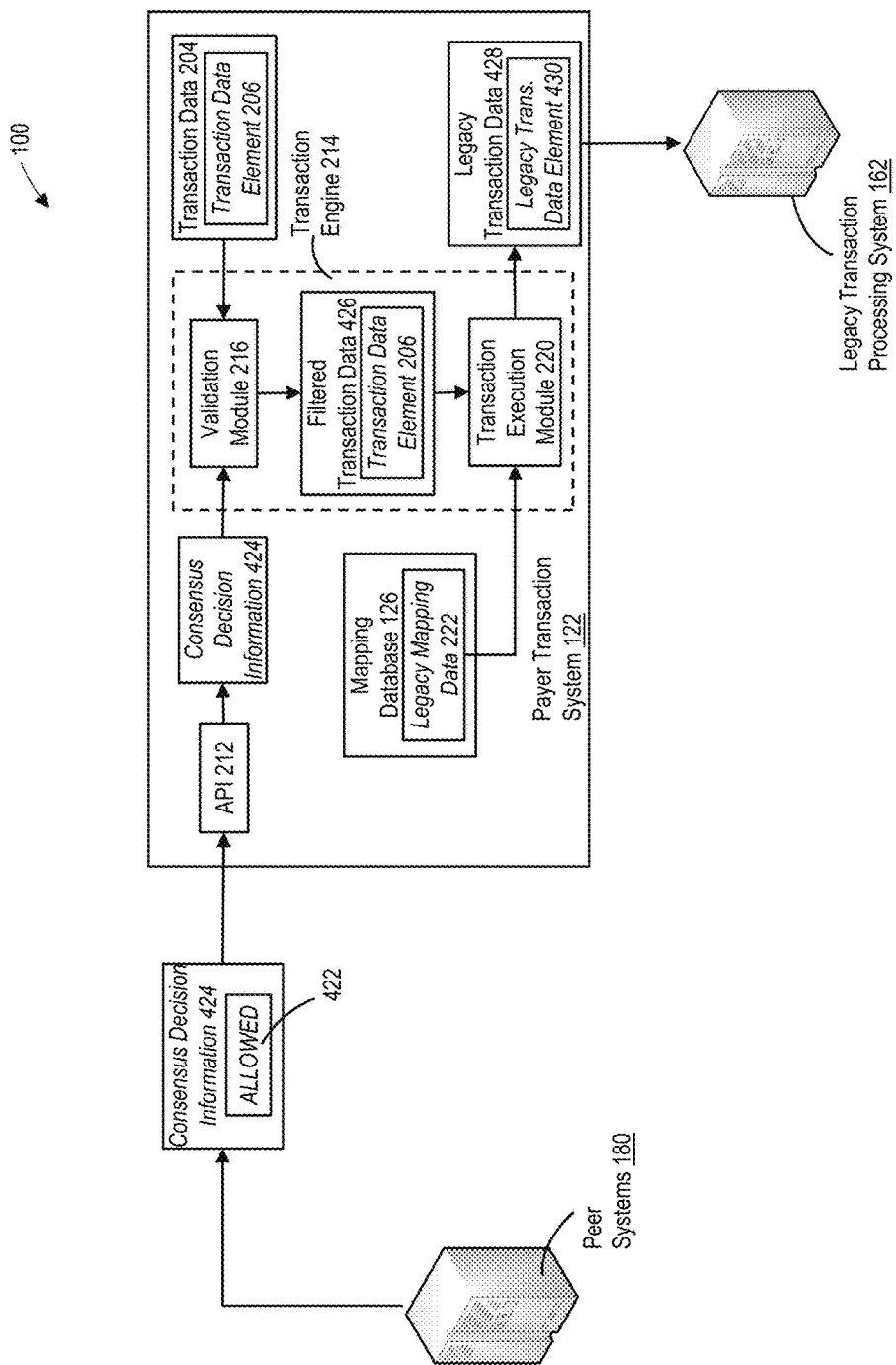

Referring to FIG. 4B, a programmatic interface of payer transaction system 122, such as API 212, may receive consensus decision information 424, which includes output data 422 indicating the determined consistency between payment instruction information 208 and corresponding ones of the counterparty- or payment-specific restrictions recorded onto permissioned distributed ledger 190, e.g., within rules data 410. API 212 may route consensus decision information 424 to validation module 216, which may perform operation that, based on the discrete elements of consensus decision information 424, filter transaction data 204 to delete those transaction data elements that include payment instruction information consistent with the corresponding ones of the counterparty- or payment-specific restrictions (and associated with corresponding "consistent" payment transactions). In some instances, validation module 216 may generate filtered transaction data 426, which includes discrete elements of transaction data 204 that are consistent with the corresponding ones of the counterparty- or payment-specific restrictions, such as, but not limited to, transaction data element 206 that characterizes the requested bill-payment transaction associated with outstanding invoice issued by payee 111. Further, as illustrated in FIG. 4B, validation module 216 may provide filtered transaction data 426 as an input to transaction execution module 220 of executed transaction engine 214.

In some instances, transaction execution module 220 may receive validated transaction data 218, and may process each element of filtered transaction data 426 and generate corresponding element of legacy transaction data 226 suitable for submission to legacy transaction processing system 162. For example, element of filtered transaction data 426, including transaction data element 206, may be structured in accordance with the ISO 20022™ standard data interchange format, and may include elements of payment instruction information and rich transaction remittance data characterizing a corresponding payment transaction.

As illustrated in FIG. 4B, transaction execution module 220 may extract, from mapping data 126 (e.g., as maintained within data repository 123), legacy mapping data 222 that maps or transforms one or more elements of data structured in accordance the ISO 20022™ standard data interchange format to corresponding elements of data structured a legacy data interchange format associated with and suitable for processing by legacy transaction processing system 162. Based on legacy mapping data 222, and using any of the exemplary mapping or transformation processes described herein, transaction execution module 220 may process each element of filtered transaction data 426 and generate a corresponding element of legacy transaction data 428 structured in accordance with the legacy data-interchange format associated with legacy transaction processing system 162.

Further, transaction execution module 220 may also package, into a corresponding portion of legacy transaction data 428 (e.g., into a header portion, etc.), additional information that, among other things, identifies payer transaction system 122 (e.g., an Internet Protocol (IP) address) and/or executed transaction engine 214 (e.g., an application cryptogram, such as a hash value, random number, cryptographic key, etc.). Transaction execution module 220 may perform additional operations that cause payer transaction system 122 to transmit legacy transaction data 428 across network 120 to legacy transaction processing system 162, which may perform any of the exemplary processes described herein to generate correlation identifiers and to execute, settle, and clear each of the consistent payment transactions in accordance with legacy transaction data 428.

Figure 5:
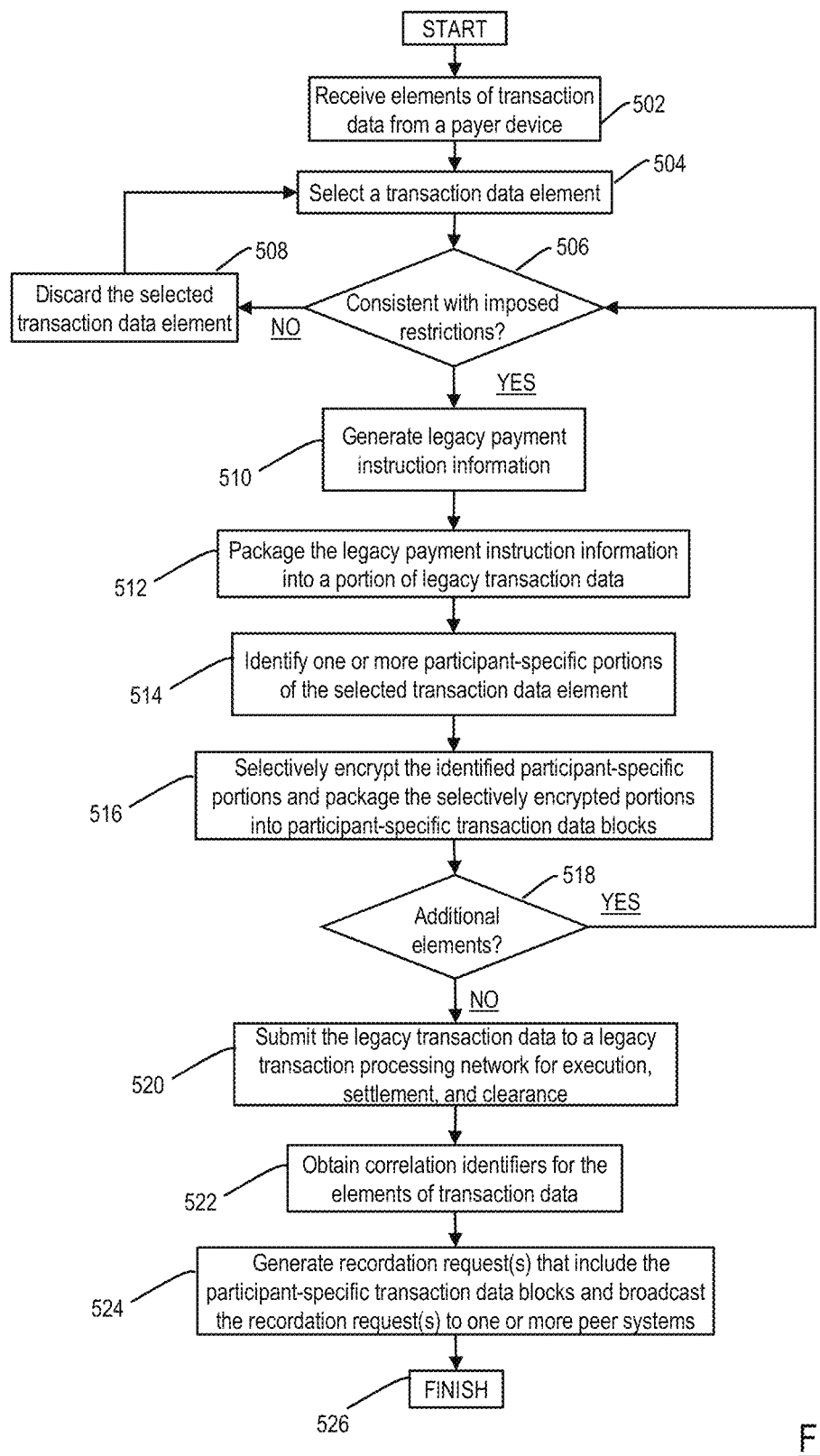
FIGS. 5 and 6 are flowcharts of exemplary processes for executing and managing cryptographically secure exchanges of data using permissioned distributed ledger, in accordance with the disclosed embodiments.

FIG. 5 is a flowchart of an exemplary process 500 for executing and managing cryptographically secure exchanges of data using permissioned distributed ledger, in accordance with the disclosed embodiments. In some instances, one or more network-connected computing systems operating within environment 100, such a payer transaction system 122, may perform the steps of exemplary process 500, which receive transaction data structured in accordance with a standardized data-interchange format, map or transform payment instruction information included within the transaction data into legacy payment information structured in accordance with a legacy data-interchange format associated with a legacy transaction processing network, and submit the legacy payment information to one or more computing systems operated by the legacy transaction processing for execution, clearance, and settlement.

Further, payer transaction system 122 may perform additional or alternate steps of exemplary process 500 that, among other things, identify elements of the received transaction data (e.g., structured in accordance with the standardized data-interchange format) that are accessible to other network-connected computing systems that participate in a permissioned distributed-ledger network, encrypt the identified participant-specific elements of the received transaction data, and broadcast the encrypted participant-specific elements of the received transaction data to one or more peer systems of the permissioned distributed-ledger network. The one or more peer systems may perform any of the exemplary processes described herein to record the encrypted, participant-specific elements of the received transaction data into ledger blocks of a permissioned distributed ledger, which may be distributed among each of the one or more peer systems and the participant systems, as described herein.

Referring to FIG. 5, payer transaction system 122 may receive transaction data generated by one or more network-connected devices operating within environment 100, such as payer device 102 of FIG. 1 (e.g., in step 502). In some instances, the received transaction data may include one or more discrete elements of transaction data, each of which may identify and characterize a corresponding payment transaction between payer 101 and one or more corresponding counterparties, such as, but not limited to payee 111.

Further, and as described herein, each of the transaction data elements may be structured in accordance with a standardized data-interchange format, such as the ISO 20022™ standard data-interchange format described herein, and may include payment instruction information specifying parameter values that characterize a corresponding one of the payment transactions and rich transaction remittance data associated with the corresponding payment transaction. Examples of the payment instruction information include, but are not limited to, a transaction type, a transaction value, a transaction date or time, identifiers of the payer and corresponding payee, and identifiers of corresponding payer and payee accounts, and examples of the rich transaction remittance data include, but are not limited to, an electronic copy of one or more pages of the invoice or the packing list, an electronic copy of a corresponding purchase order, or payment advice, as described herein.

In some instances, payer transaction system 122 may perform operations that parse the received transaction data and select a corresponding one of the transaction data elements for additional processing (e.g., in step 504). As described herein, the selected transaction data element may be associated with a corresponding one of the payment transactions, and payer transaction system 122 may perform any of the exemplary processes described herein to determine whether the selected transaction data element, and the corresponding payment transaction, are consistent with one or more counterparty- or payment-specific restrictions (e.g., in step 506).

In one exemplary embodiment, and as described herein, payer transaction system 122 may extract payment instruction information from the selected transaction data element, and package the extracted payment instruction information into a corresponding portion of a validation request, which payer transaction system 122 may broadcast to one or more of peer systems 180. As described herein, the one or more of peer systems 180, including peer system 182, may receive the validation request, and access a locally maintained copy of a permissioned distributed ledger, e.g., distributed ledger 190 of FIG. 4A.

In some instances, distributed ledger 190 may record, within one or more ledger blocks, rules data that identifies and characterizes one or more counterparty- or payment-specific restrictions imposed on elements of transaction data (e.g., rules data 410 of FIG. 4A) submitted to legacy transaction processing system 162 for execution, clearance, and settlement. Further, and as described herein, distributed ledger 190 may also include one or more ledger blocks recording elements of code that, when executed by peer systems 180 in conjunction with supporting data, perform operations consistent with a distributed smart contract (e.g., smart contract ledger blocks 412 of FIG. 4A).

As described herein, smart contract ledger blocks 412 may include one or more application modules that, when executed by peer systems 180, performs consensus-based operations that apply the one or more counterparty- or payment-specific restrictions maintained in rules data 410 to a received transaction data element and determine whether the corresponding payment transaction is consistent with the one or more counterparty- or payment-specific restrictions. In some instances, the consensus-based operations may enable peer systems 180 to generate consensus decision information indicative of the consistency, or inconsistency, and peer systems 180 may transmit the consensus decision information across network 120 to payer transaction system 122, e.g., as a response to the validation request.

Referring back to FIG. 5, if payer transaction system 122 were to establish an inconsistency between the selected element of transaction data and the one or more counterparty- or payment-specific restrictions (e.g., step 506; NO), payer transaction system 122 may discard the selected transaction data element (e.g., in step 508). Exemplary process 500 may then pass back step 504, and payer transaction system 122 may perform operations that select an additional element of the received transaction data for processing.

Alternatively, if payer transaction system 122 were to establish a consistency between the selected element of transaction data and the one or more counterparty- or payment-specific restrictions (e.g., step 506; YES), payer transaction system 122 may perform any of the exemplary mapping and transformation processes described herein to generate legacy payment instruction information structured in accordance with a legacy data-interchange format associated with a legacy transaction processing system (e.g., in step 510). For example, in step 510, payer transaction system 122 may perform operations that extract the payment instruction information from the selected element of transaction data (e.g., structured in accordance with the ISO 20022™ standard data-interchange format), that access legacy mapping data that characterizes the legacy data-interchange format, and that generate the legacy payment instruction information based on an application of the legacy mapping data to portions of the extracted payment instruction information.

Payer transaction system 122 may also perform operations that package the legacy payment instruction information into corresponding elements of legacy transaction data (e.g., in step 512). In some instances, the legacy transaction data may also include (e.g., into a header portion, etc.), additional information that, among other things, identifies payer transaction system 122 (e.g., a unique network address, such as an Internet Protocol (IP) address) and/or one or more executed application programs or program modules (e.g., an application cryptogram associated with transaction engine 214, such as a hash value, random number, cryptographic key, etc.).

In further instances, payer transaction system 122 may perform additional operations that identify one or more portions of the selected element of transaction data that are accessible to one or more participants in the exemplary permissioned distributed-ledger network described herein, such as, but not limited to, payee device 112, payee transaction system 142, and regulatory system 172 (e.g., in step 514). As described herein, the selected element of the transaction data may include payment instruction information specifying parameter values that characterize a corresponding one of the payment transactions and rich transaction remittance data associated with the corresponding payment transaction, each of which may be structured in accordance with the ISO 20022™ standard data-interchange format.

For example, in step 514, payer transaction system 122 may obtain accessibility data (e.g., as maintained within data repository 123) that identifies and characterizes certain portions of the payment instruction information and rich transaction remittance data that are accessible to, among other things, payee device 112, payee transaction system 142, and regulatory system 172. Based on portions of the accessibility data, payer transaction system 122 may perform any of the exemplary processes described herein in step 514 to identify and extract a corresponding portion of the payment instruction information and/or the rich transaction remittance data that is accessible to payee device 112, payee transaction system 142, and regulatory system 172, e.g., as corresponding elements of participant-specific transaction data blocks.

Payer transaction system 122 may further operations that selectively encrypt each of the participant-specific transaction data with a public cryptographic key associated with corresponding ones of payee device 112, payee transaction system 142, and regulatory system 172, which participate in the permissioned distributed-ledger network (e.g., in step 516). Further, payer transaction system 122 may perform any of the exemplary processes described herein to package the encrypted elements of participant-specific transaction data within a corresponding portion of participant-specific transaction data blocks (such as, but not limited to, first participant-specific data block 244, second participant-specific data block 252, and third participant-specific data block 260), along with corresponding elements of the data access control information described herein (e.g., also in step 516).

Further, payer transaction system 122 may perform operations that determine, based on the received transaction data, whether additional elements of the transaction data require processing (e.g., in step 518). If payer transaction system 122 were to determine that additional transaction data elements require processing (e.g., step 518; YES), exemplary process 500 may then pass back step 504, and payer transaction system 122 may perform operations that select an additional element of the received transaction data for processing.

Alternatively, if payer transaction system 122 were to determine that no additional transaction data elements require processing (e.g., step 518; NO), payer transaction system 122 may transmit the packaged elements of the legacy transaction data across network 120 to one or more computing systems associated with the legacy transaction processing network, such as legacy transaction processing system 162 (e.g., in step 520). In some instances, legacy transaction processing system 162 may perform any of the exemplary processes described herein to execute, clear, and settle, each of the payment transactions in accordance with corresponding elements of legacy transaction data.

Payer transaction system 122 may also obtain a unique alphanumeric identifier for each element of the transmitted legacy transaction data, e.g., a correlation identifier, and may perform operations that store the elements of the transmitted legacy transaction data and corresponding ones of the correlation identifiers within one or more tangible, non-transitory memories, such as within a portion of transaction database 130 of account database 128 (e.g., in step 522). In some instances, payer transaction system 122 may generate one or more of the correlation identifiers (e.g., prior to transmitting the legacy transaction data to legacy transaction processing system 162), or may receive one or more of the correlation identifiers from legacy transaction processing system 162.

In some instances, payer transaction system 122 may perform operations that package each of the participant-specific transaction data blocks (such as, but not limited to, first participant-specific data block 244, second participant-specific data block 252, and third participant-specific data block 260) into one or more recordation requests, which payer transaction system 122 may broadcast across network 120 to each of peer systems 180 (e.g., in step 524). As described herein, each of the one of more recordation requests may include additional information that, among other things, identifies payer transaction system 122 (e.g., a unique network address, such as an Internet Protocol (IP) address) and/or one or more executed application programs or program modules (e.g., an application cryptogram associated with transaction engine 214, such as a hash value, random number, cryptographic key, etc.).

Further, and as described herein, peer systems 180 may perform any of the consensus-based processes described herein to immutably record each of the participant-specific transaction data blocks within an additional ledger block of the permissioned distributed ledger, and to distribute an updated version of the permissioned distributed ledger, including the additional ledger block, among peer systems 180 and the participants in the permissioned distributed-ledger network, such as payee device 112, payer transaction system 122, payee transaction system 142, or regulatory system 172. Exemplary process 500 is then complete in step 526.

Figure 6:
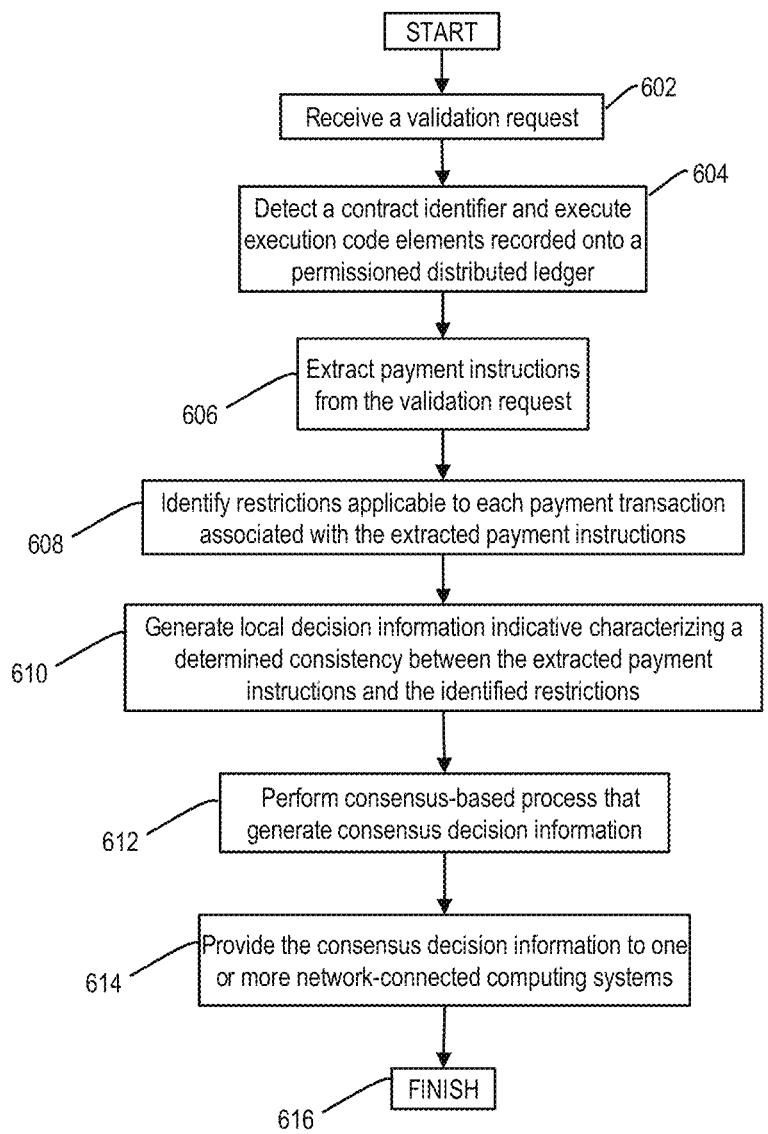

FIG. 6 is a flowchart of an exemplary process 600 for executing and managing cryptographically secure exchanges of data using permissioned distributed ledger, in accordance with the disclosed embodiments. In some instances, one or more network-connected peer systems associated with a permissioned distributed-ledger network within environment 100, such as peer system 182, may perform any of the steps of exemplary process 600, which determine whether a received element of transaction data is consistent with, and conforms with, counterparty- or payment-specific transaction restrictions based on rules data immutably recorded onto a permissioned distributed ledger and through an execution of a distributed smart contract recorded onto that permissioned distributed ledger.

Referring to FIG. 6, peer system 182 (or another one of peer systems 180) may receive a validation request generated and broadcasted across network 120 by a computing system associated with the permissioned distributed-ledger network, such as payer transaction system 122 (e.g., in step 602). As described herein, the validation request may include, among other things, payment instruction information characterizing one or more payment transactions (e.g., structured in accordance with the ISO 20022™ standard data-interchange format) and a unique identifier of the distributed smart contract recorded within the permissioned distributed ledger, such as a network address associated with the smart contract ledger blocks.

Based on a detected presence of the contract identifier, peer system 182 (or another one of peer systems 180) may access the permissioned distributed ledger and perform operations that invoke the distributed smart contract and thus, the execution of the code elements that establish the distributed smart contract (e.g., in step 606). Further, peer system 182 (or another one of peer systems 180) may perform additional operations that extract payment instruction information and provide the extracted payment instruction information to the executed application programs or program modules that establish the invoked distributed smart contract. As described herein, the extracted payment instruction information may include parameter values that characterize the one or more payment transactions, and examples of these parameter values include, but are not limited to, a transaction type, a transaction amount, a transaction date or time, a payer or payee identifier, and/or an identifier of a source or destination account.

In some instances, peer system 182 (or another one of peer systems 180) may access elements of rules data recorded onto the permissioned distributed ledger, and through the execution of the code elements that establish the distributed smart contract, may perform any of the exemplary processes described herein to identify one or more counterparty- or payment-specific restrictions applicable to each of the one or more payment transactions (e.g., in step 608). Further, in step 610, and through the execution of the code elements that establish the distributed smart contract, peer system 182 (or another one of peer systems 180) may perform any of the exemplary processes described herein to: determine whether the parameter values that characterize each of the one or more payment transactions are consistent with the applicable counterparty- or payment-specific restrictions; and generate elements of local decision information indicative characterizing the determined consistency between the parameter values that characterize each of the one or more payment transactions and the applicable counterparty- or payment-specific restrictions.

In some instances, peer system 182 (or another one of peer systems 180) may perform any of the exemplary consensus-based processes described herein to establish, in conjunction with additional ones of peer systems 180, a consensus decision regarding the consistency of the one or more payment transactions and the counterparty- or payment-specific restrictions recorded onto the permissioned distributed ledger, and to generate corresponding elements of consensus decision information characterizing the established consensus (e.g., in step 614). Further, in step 616, peer system 182 (or another one of peer systems 180) to transmit the consensus decision information across network 120 to payer transaction system 122, e.g., as a response to the validation request. As described herein, payer transaction system 122 may perform operations that generate legacy transaction data characterizing each of the consistent payment transactions and structured in accordance with a legacy data-interchange format associated with a legacy transaction processing network, and that submit the legacy transaction data to one or more computing systems operated by the legacy transaction processing network, such as, but not limited to, legacy transaction processing system 162. Exemplary process 600 is then complete in step 616.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including, but not limited to, payment application 202, APIs 212, 262, 272, and 310, transaction engine 214, validation module 216, transaction execution module 220, validation module 227, correlation module 229, participant block generation module 236, block generation module 274, distributed consensus module 284, transaction engine 312, settlement module 314, reconciliation module 318, initiation module 408, and initiation module 414, can be implemented as one or more computer programs, i.e., one or more modules of computer program instructions encoded on a tangible non-transitory program carrier for execution by, or to control the operation of, a data processing apparatus (or a computer system).

Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and/or "system" refer to data processing hardware and encompasses all kinds of apparatus, devices, and machines for processing data, including by way of example a programmable processor, a computer, or multiple processors or computers. The apparatus, device, and/or system can also be or further include special purpose logic circuitry, such as an FPGA (field programmable gate array) or an ASIC (application-specific integrated circuit). The apparatus, device, and/or system can optionally include, in addition to hardware, code that creates an execution environment for computer programs, such as code that constitutes processor firmware, a protocol stack, a database management system, an operating system, or a combination of one or more of them. Further, each of the apparatus, device, and/or system may also include a communications unit or interface, such as a wireless transceiver, coupled to one or more of the processors and configured by the one or more processors to facilitate communications and exchanges of data across a communications network.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube), LCD (liquid crystal display) monitor, TFT display, or OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Additionally, and in this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications interface;
a memory storing instructions; and
at least one processor coupled to the communications interface and the memory, the at least one processor being configured to execute the instructions to:
receive, from a first computing system via the communications interface, confirmation data indicative of a consistency between (i) parameter values that characterize an exchange of data and (ii) rules data recorded within an element of a distributed ledger;
based on the confirmation data, transmit, via the communications interface, a request to execute the data exchange to a second computing system, the second computing system being configured to execute the data exchange in accordance with at least a portion of the parameter values; and
transmit, via the communications interface, a recordation request to the first computing system, the recordation request causing the second computing system to perform operations that record an encrypted portion of content associated with the data exchange within an additional element of the distributed ledger.

2. The apparatus of claim 1, wherein:
the at least one processor is further configured to execute the instructions to obtain transaction data that includes the parameter values and the content associated with the data exchange;
the transaction data is structured in accordance with a standard data-interchange format; and
the request to execute the data exchange is structured in accordance with a legacy data-interchange format associated with the second computing system.

3. The apparatus of claim 2, wherein the at least one processor is further configured to execute the instructions to:
load mapping data from the memory, the mapping data comprising information that maps the standard data-interchange format to the legacy data-interchange format; and
generate the request to execute the data exchange based on an application of the mapping data to at least the portion of the parameter values.

4. The apparatus of claim 2, wherein the at least one processor is further configured to execute the instructions to receive the transaction data from a device via the communications interface, the transaction data being generated by an application program executed at the device.

5. The apparatus of claim 1, wherein the at least one processor is further configured to execute the instructions to generate the request to execute the data exchange, the request comprising the portion of the parameter values.

6. The apparatus of claim 1, wherein:
the at least one processor is further configured to transmit the parameter values to the first computing system via the communications interface; and
the first computing system is further configured to execute additional instructions included within a distributed ledger, the executed additional instructions causing the first computing system to access the rules data maintained within the element of the distributed ledger, establish the consistency between the parameter values and at least a portion of the rules data, and generate the confirmation data based on the established consistency.

7. The apparatus of claim 6, wherein:
the portion of the rules data identifies one or more restrictions imposed on the execution of the data exchange;
the executed additional instructions further cause the first computing system to:
identify a subset of the one or more restrictions that are applicable to the data exchange; and
establish a consistency between the parameter values and the identified subset of the one or more restrictions; and
the confirmation data is indicative of the established consistency between the parameter values and the identified subset of the one or more restrictions.

8. The apparatus of claim 1, wherein:
the at least one processor is further configured to execute the instructions to:
encrypt the portion of the content based on a public cryptographic key associated with the first computing system; and
perform operations that package, into the recordation request, an identifier assigned to the data exchange and the encrypted portion of the content; and
the recordation request further causes the first computing system to record the identifier and the encrypted portion of the content within the additional element of the distributed ledger.

9. The apparatus of claim 8, wherein:
the at least one processor is further configured to execute the instructions to:
apply a digital signature to the identifier and the encrypted portion of the content;
generate data access control information that includes the digital signature, public key certificate data associated with the apparatus, and public key certificate data associated with the first computing system; and
perform operations that package, into the recordation request, the identifier, the encrypted portion of the content, and the data access control information; and
the recordation request further causes the first computing system to record the identifier, the encrypted portion of the content, and the data access control information within the additional element of the distributed ledger.

10. The apparatus of claim 1, wherein the content associated with the data exchange comprises at least one of an element of digital content or advice data associated with the data exchange.

11. A computer-implemented method, comprising:
receiving, using at least one processor, confirmation data from a first computing system, the confirmation data being indicative of a consistency between (i) parameter values that characterize an exchange of data and (ii) rules data recorded within an element of a distributed ledger;

based on the confirmation data, transmitting, using the at least one processor, a request to execute the data exchange to a second computing system, the second computing system being configured to execute the data exchange in accordance with at least a portion of the parameter values; and transmitting, using the at least one processor, a recordation request to the first computing system, the recordation request causing the second computing system to perform operations that record an encrypted portion of content associated with the data exchange within an additional element of the distributed ledger.

12. The computer-implemented method of claim 11, wherein:
the computer-implemented method further comprises obtaining, using the at least one processor, transaction data that includes the parameter values and the content associated with the data exchange;
the transaction data is structured in accordance with a standard data-interchange format; and
the request to execute the data exchange is structured in accordance with a legacy data-interchange format associated with the second computing system.

13. The computer-implemented method of claim 12, further comprising:
obtaining mapping data using the at least one processor, the mapping data comprising information that maps the standard data-interchange format to the legacy data-interchange format; and
generating, using the at least one processor, the request to execute the data exchange based on an application of the mapping data to at least the portion of the parameter values.

14. The computer-implemented method of claim 12, further comprising:
receiving, using the at least one processor, the transaction data from a device, the transaction data being generated by an application program executed at the device; and
generating, using the at least one processor, the request to execute the data exchange, the request comprising the portion of the parameter values.

15. The computer-implemented method of claim 11, wherein:
the computer-implemented method further comprises transmitting the parameter values to the first computing system using the at least one processor;
the first computing system is further configured to execute additional instructions included within a distributed ledger; and
the executed additional instructions cause the first computing system to access the rules data maintained within the element of the distributed ledger, establish the consistency between the parameter values and at least a portion of the rules data, and generate the confirmation data based on the established consistency.

16. The computer-implemented method of claim 15, wherein:
the portion of the rules data identifies one or more restrictions imposed on the execution of the data exchange;
the executed additional instructions further cause the first computing system to:
identify a subset of the one or more restrictions that are applicable to the data exchange; and
establish a consistency between the parameter values and the identified subset of the one or more restrictions; and
the confirmation data is indicative of the established consistency between the parameter values and the identified subset of the one or more restrictions.

17. The computer-implemented method of claim 11, wherein:
the computer-implemented method further comprises:
encrypting, using the at least one processor, the portion of the content based on a public cryptographic key associated with the first computing system; and
using the at least one processor, performing operations that package, into the recordation request, an identifier associated with the data exchange and the encrypted portion of the content; and
the recordation request further causes the first computing system to record the identifier and the encrypted portion of the content within the additional element of the distributed ledger.

18. The computer-implemented method of claim 17, wherein:
the computer-implemented method further comprises:
applying, using the at least one processor, a digital signature to the identifier and the encrypted portion of the content;
generating, using the at least one processor, data access control information that includes the digital signature, public key certificate data associated with the at least one processor, and public key certificate data associated with the first computing system; and
using the at least one processor, performing operations that package, into the recordation request, the identifier, the encrypted portion of the content, and the data access control information; and
the recordation request further causes the first computing system to record the identifier, the encrypted portion of the content, and the data access control information within the additional element of the distributed ledger.

19. The computer-implemented method of claim 11, wherein the content associated with the data exchange comprises at least one of an element of digital content or advice data associated with the data exchange.

20. A tangible, non-transitory computer-readable medium storing instructions that, when executed by at least one processor, cause the at least one processor to perform a method, comprising:
receiving confirmation data from a first computing system, the confirmation data being indicative of a consistency between (i) parameter values that characterize an exchange of data and (ii) rules data recorded within an element of a distributed ledger;
based on the confirmation data, transmitting a request to execute the data exchange to a second computing system, the second computing system being configured to execute the data exchange in accordance with at least a portion of the parameter values; and
transmitting a recordation request to the first computing system, the recordation request causing the second computing system to perform operations that record an encrypted portion of content associated with the data exchange within an additional element of the distributed ledger.

* * * * *